United States Patent
Nishio et al.

[11] Patent Number: 5,831,772
[45] Date of Patent: *Nov. 3, 1998

[54] COMPACT ZOOM LENS

[75] Inventors: Akihiro Nishio; Takeshi Koyama; Kouji Hoshi; Yoshinori Itoh; Makoto Misaka, all of Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 763,625

[22] Filed: Dec. 4, 1996

Related U.S. Application Data

[63] Continuation of Ser. No. 220,548, Mar. 31, 1994, abandoned.

[30] Foreign Application Priority Data

| Apr. 7, 1993 | [JP] | Japan | 5-106074 |
| Dec. 1, 1993 | [JP] | Japan | 5-329869 |

[51] Int. Cl.⁶ .................................................. G02B 15/14
[52] U.S. Cl. .......................... 359/689; 359/784; 359/791
[58] Field of Search .................................. 359/689, 791, 359/708, 784

[56] References Cited

U.S. PATENT DOCUMENTS

| 4,978,204 | 12/1990 | Ito | 359/689 |
| 5,166,828 | 11/1992 | Ogata | 359/689 |
| 5,218,476 | 6/1993 | Ito | 359/689 |
| 5,272,566 | 12/1993 | Aoki | 359/791 |
| 5,315,439 | 5/1994 | Ito | 359/689 |
| 5,363,243 | 11/1994 | Takayuki | 359/689 |
| 5,365,376 | 11/1994 | Itoh | 359/686 |
| 5,379,154 | 1/1995 | Shibayama | 359/689 |
| 5,523,888 | 6/1996 | Nishio | 359/686 |
| 5,585,971 | 12/1996 | Itoh | 359/692 |
| 5,587,840 | 12/1996 | Itoh | 359/686 |

FOREIGN PATENT DOCUMENTS

| 57-201213 | 12/1982 | Japan . |
| 58-184916 | 10/1983 | Japan . |
| 60-170816 | 9/1985 | Japan . |
| 60-191216 | 9/1985 | Japan . |
| 62-56917 | 3/1987 | Japan . |
| 62-78522 | 4/1987 | Japan . |
| 63-153511 | 6/1988 | Japan . |
| 2-256015 | 10/1990 | Japan . |
| 3-59406 | 9/1991 | Japan . |
| 3-282409 | 12/1991 | Japan . |
| 4-37810 | 2/1992 | Japan . |
| 4-16764 | 3/1992 | Japan . |
| 4-76511 | 3/1992 | Japan . |
| 4-223419 | 8/1992 | Japan . |

*Primary Examiner*—Son Mai
*Attorney, Agent, or Firm*—Fitzpatrick, Cella, Harper & Scinto

[57] ABSTRACT

A zoom lens is disclosed, comprising, from front to rear, a first, second and third lens units of positive, positive and negative refractive powers, respectively, all the lens units moving forward to effect zooming from the wide-angle end to the telephoto end, the first lens unit including at least one negative and at least one positive lenses, and the second lens unit including a negative lens whose front surface is concave, a positive lens and a cemented lens composed of a negative lens whose rear surface is concave and a bi-convex lens, and the zoom lens satisfying the following condition:

$$0.2 < \beta_{2W}/\beta_{3W} < 0.5 \text{ (where } \beta_{2W} > 0, \beta_{3W} > 0)$$

where $\beta_{2W}$ and $\beta_{3W}$ are the lateral magnifications in the wide-angle end of the second and third lens units, respectively.

16 Claims, 21 Drawing Sheets

(WIDE)

(TELE)

(WIDE)

(TELE)

COMPACT ZOOM LENS

This application is a continuation of application Ser. No. 08/220,548 filed Mar. 31, 1994, now abandoned.

BACKGROUND OF THE INVENTION

1. Field of the Invention

This invention relates to zoom lenses comprised of three lens units suited to leaf shutter cameras, or video cameras and, more particularly, to zoom lenses whose range is 2.7 to 2.85 or thereabout in compact form and which are well corrected for aberrations and shortened in the total length (from the vertex of the first lens surface to an image plane) of the entire system by setting forth proper design rules for each of the lens units.

2. Description of the Related Art

Recently, there is a growing demand for zoom lenses of high range which, nonetheless, have their total length shortened to compact form, as the leaf shutter camera, or video camera decreases even more in size.

A zoom lens for the leaf shutter camera comprising, from front to rear, a first lens unit of positive refractive power and a second lens unit of negative refractive power with the separation therebetween being varied to effect zooming, that is, so-called 2-unit zoom lens, has previously been proposed in, for example, Japanese Laid-Open Patent Applications Nos. Sho 57-201213, Sho 60-170816, Sho 60-191216, Sho 62-56917 and others.

This 2-unit type of zoom lens has the advantage that the moving mechanism for zooming is simple in structure.

However, because the zooming function is provided mainly in the second lens unit, the zoom ratio is about 1.6 to 2. To assure a great increase of the zoom ratio, therefore, the lens system tends to increase in size largely.

On this account, as derived from the 2-unit zoom lens by dividing the first lens unit of positive refractive power into two parts of positive refractive powers, a zoom lens comprising three lens units of positive, positive and negative refractive powers as a whole and having the zooming function given to the second and third lens units, or 3-unit one, is being proposed in, for example, Japanese Laid-Open Patent Applications Nos. Hei 3-282409, Hei 4-37810, Hei 4-76511 and Hei 4-223419.

Also, in Japanese Laid-Open Patent Application No. Sho 63-153511, Japanese Patent Publications Nos. Hei 4-16764 and Hei 3-59406, and Japanese Laid-Open Patent Applications Nos. Hei 4-37810 and Hei 2-256015, a zoom lens comprising, from front to rear, a first lens unit of positive refractive power, a second lens unit of positive refractive power and a third lens unit of negative refractive power in compact form is proposed wherein each of these lens units, during zooming, is moved under a prescribed condition for the purpose of making the total length of the entire system and the back focal length relatively short.

With the use of the above-described features in the 3-unit zoom lens comprised of the first lens unit of positive refractive power, the second lens unit of positive refractive power and the third lens unit of negative refractive power, when to fulfill the requirements of minimizing the bulk and size of the entire lens system and obtaining good optical performance throughout the entire zooming range at a zoom ratio of about 2.7, there is need to make appropriate the construction and arrangement of the constituent lenses of each lens unit.

The zoom lenses proposed in the before-mentioned Japanese Patent Publications Nos. Hei 3-59406 and Hei 4-16764 have their ranges each of the order of about 2. So, the zoom ratio is not always high enough.

The zoom lenses proposed in the Japanese Laid-Open Patent Applications Nos. Sho 63-153511 and Hei 2-256015 also suffer from becoming large in size as a whole, because the first lens unit is relatively bulky.

The zoom lens proposed in Japanese Laid-Open Patent Application No. Hei 4-37810, because of the negative lens in the second lens unit being unduly near to the stop, has a tendency to make it difficult to correct lateral chromatic aberration.

In general, if the refractive power of each of the lens units movable for zooming is strengthened, the total zooming movement of these lens units decreases, making it possible to shorten the total length of the complete lens.

However, the mere strengthening of the refractive powers of the lens units leads to an increase in the range of variation of aberrations with zooming, thus giving rise to a difficult problem of correcting this well.

SUMMARY OF THE INVENTION

The present invention is concerned with a zoom lens comprising three lens units as a whole and sets forth appropriate design rules for each of the lens units. It is, therefore, an object of the invention to provide a zoom lens having a range of about 2.7 and a maximum angle of view-field of 60 degrees, while still permitting the total length to be shortened in such a manner that high optical performance is maintained throughout the entire zooming range.

According to the invention, in an embodiment thereof, a zoom lens comprises, from front to rear, a first lens unit of positive refractive power, a second lens unit of positive refractive power and a third lens unit of negative refractive power, totaling three lens units, wherein zooming from a wide-angle end to a telephoto end is performed by moving the first, second and third lens units each toward the object side in such a manner that an air separation between the first and second lens units increases and an air separation between the second and third lens units decreases, the first lens unit including at least one negative lens and at least one positive lens, the second lens unit including a negative lens having a concave surface facing the object side, a positive lens and a cemented lens composed of a negative lens having a concave surface facing the image side and a positive lens having both surfaces convex, and wherein, letting the lateral magnifications in the wide-angle end of the second and third lens units be denoted by $\beta_{2W}$ and $\beta_{3W}$, respectively, the following condition is satisfied:

$$0.19 < \beta_{2W}/\beta_{3W} < 0.5 \text{ (where } \beta_{2W} > 0, \beta_{3W} > 0) \tag{1}$$

In another embodiment of the invention, a zoom lens comprises, from front to rear, a first lens unit of positive refractive power, a second lens unit of positive refractive power and a third lens unit of negative refractive power, totaling three lens units, wherein zooming from a wide-angle end to a telephoto end is performed by moving the first, second and third lens units each toward the object side in such a manner that an air separation between the first and second lens units increases and an air separation between the second and third lens units decreases, the first lens unit including at least one negative lens and at least one positive lens, and the second lens unit including a cemented lens composed of a negative lens having a concave surface facing the object side and a positive lens and a cemented lens composed of a negative lens having a concave surface facing the image side and a positive lens having both surfaces convex.

DETAILED DESCRIPTION OF THE PREFERRED EMBODIMENTS

Figure 1:
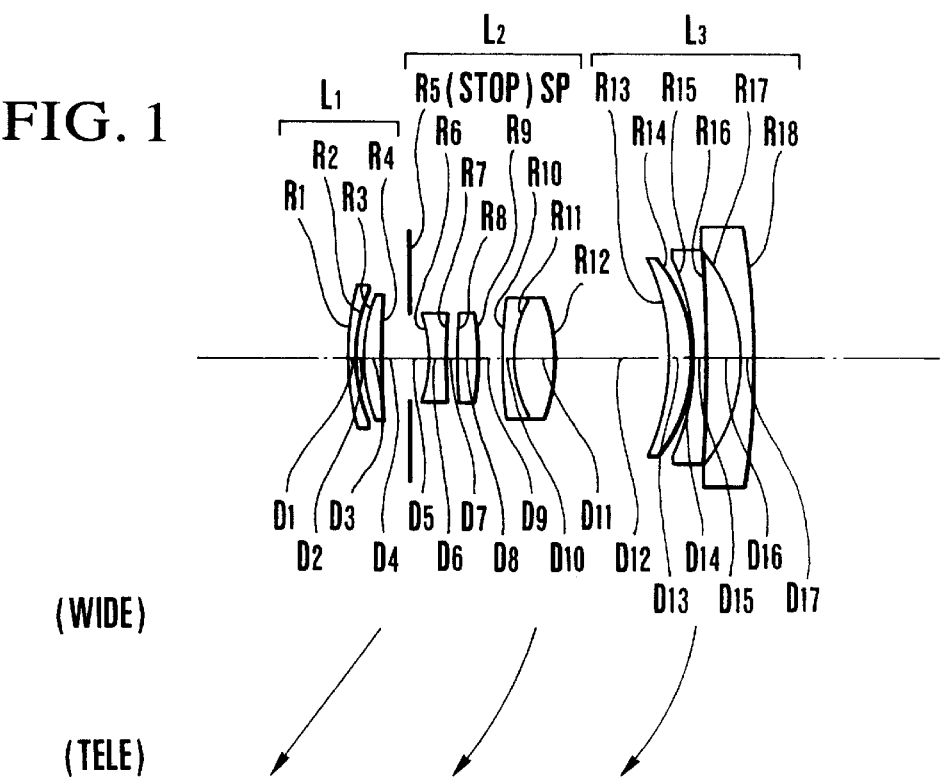
FIG. 1 is a longitudinal section view of a numerical example 1 of the zoom lens of the invention.
Figure 2:
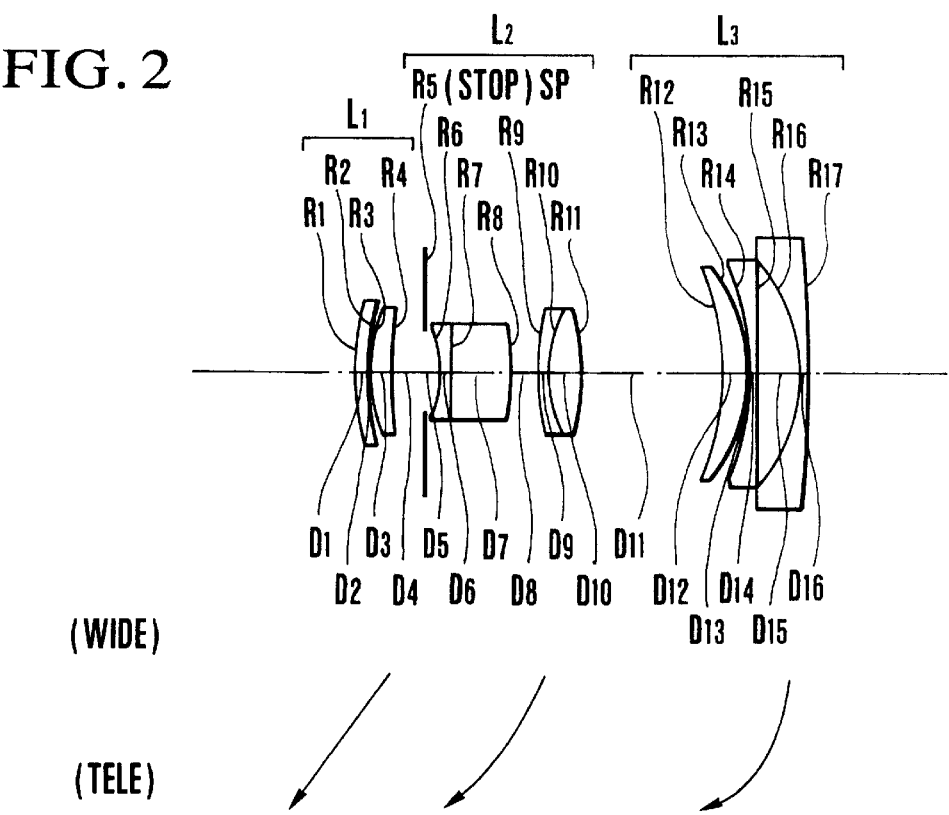
FIG. 2 is a longitudinal section view of a numerical example 2 of the zoom lens of the invention.
Figure 3:
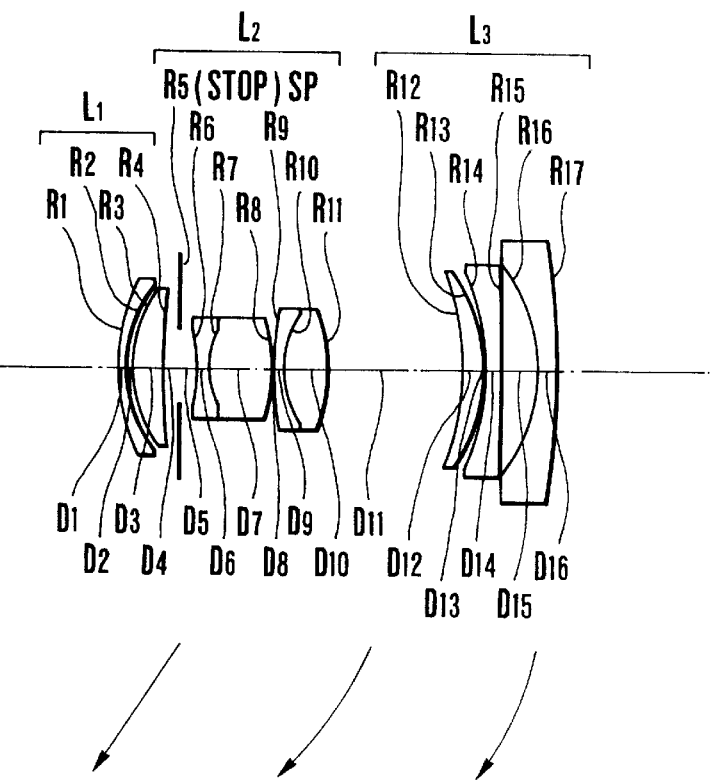
FIG. 3 is a longitudinal section view of a numerical example 3 of the zoom lens of the invention.
Figure 4:
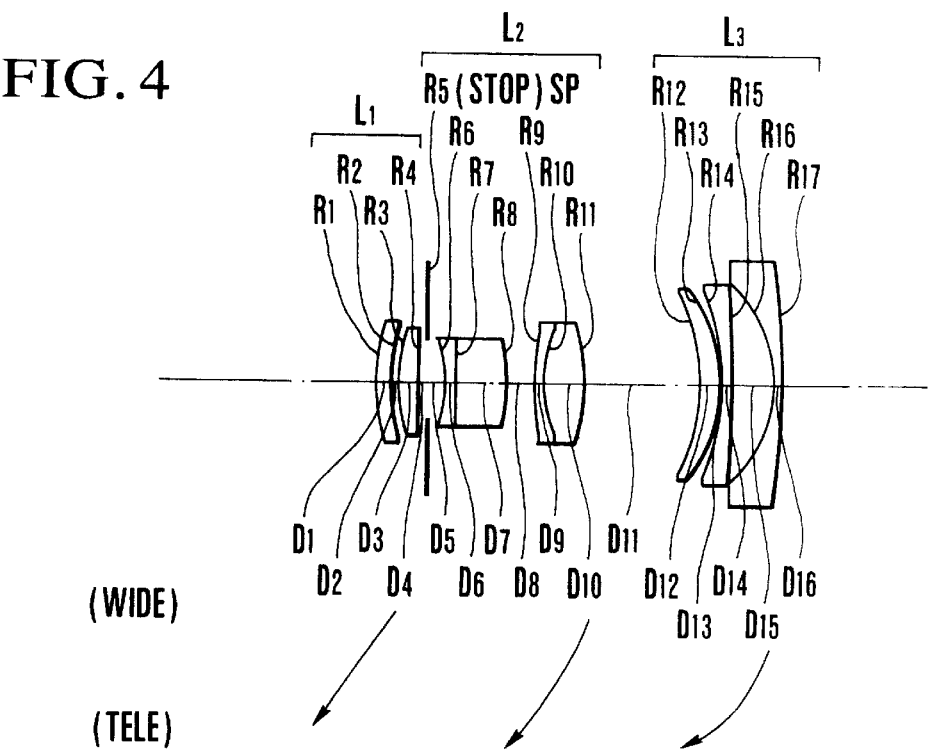
FIG. 4 is a longitudinal section view of a numerical example 4 of the zoom lens of the invention.
Figure 5:
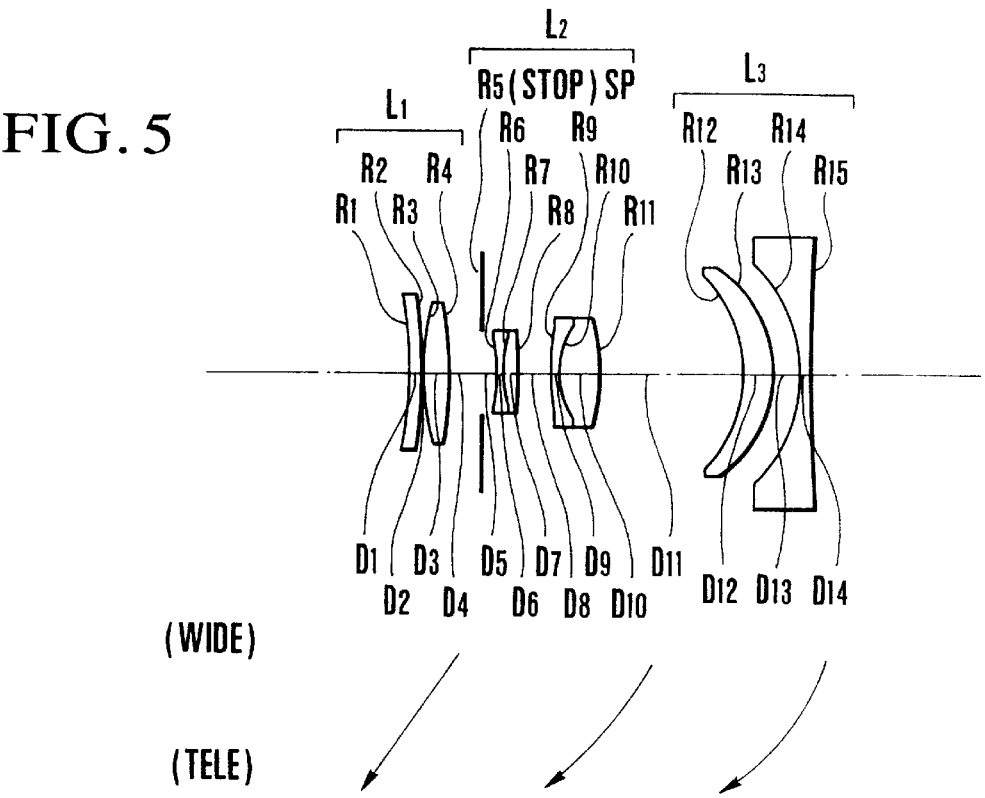
FIG. 5 is a longitudinal section view of a numerical example 5 of the zoom lens of the invention.
Figure 6:
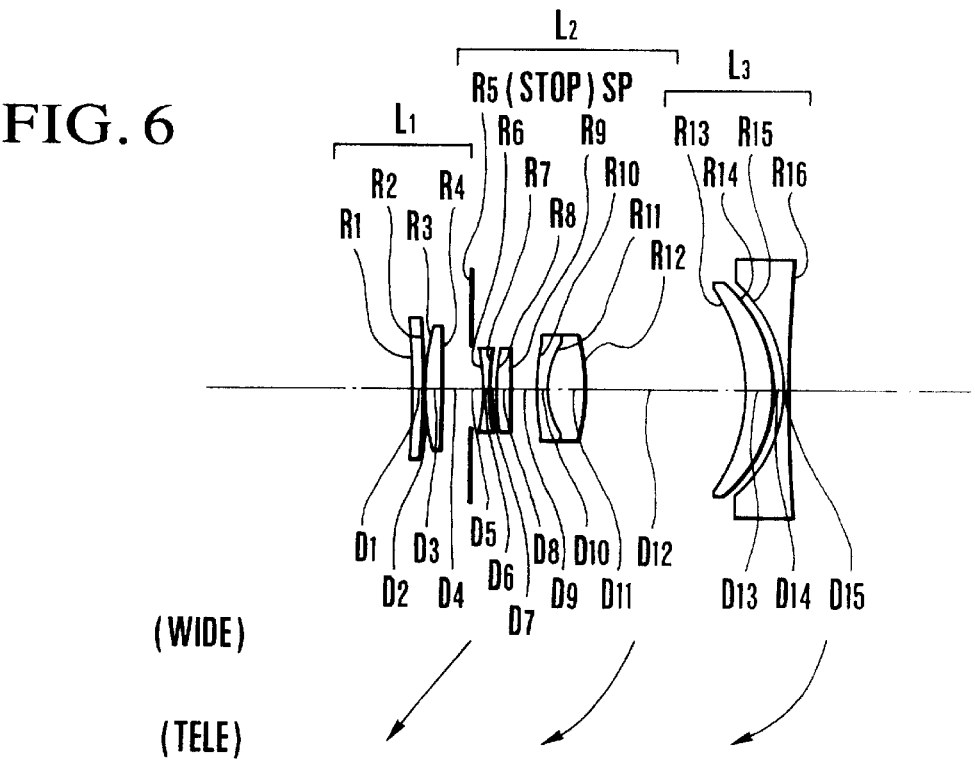
FIG. 6 is a longitudinal section view of a numerical example 6 of the zoom lens of the invention.
Figure 7A:
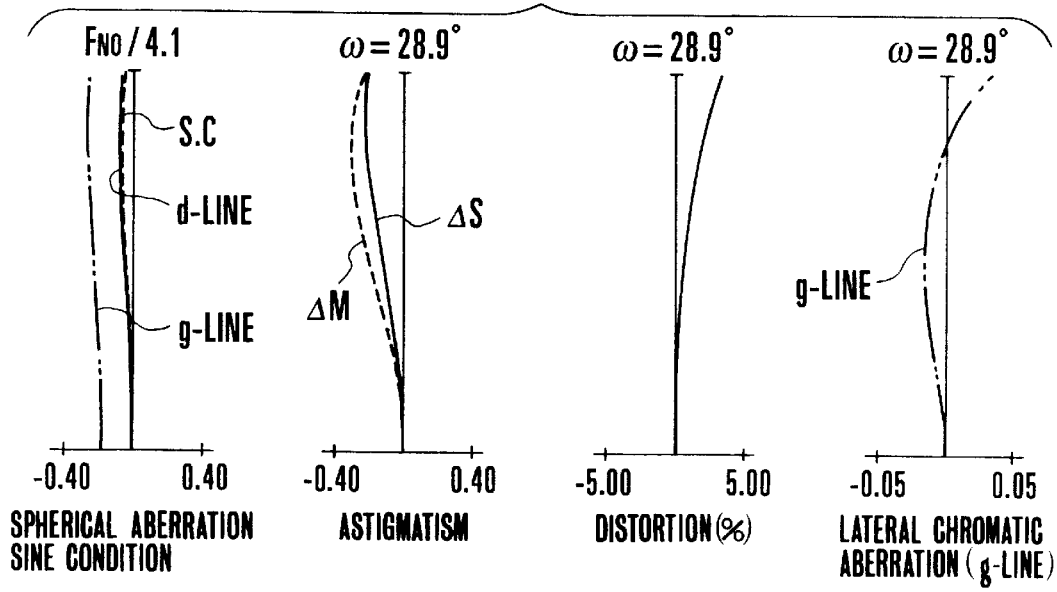
FIGS. 7(A), 7(B) and 7(C) are graphic representations of the aberrations of the numerical example 1 of the invention.
Figure 7B:
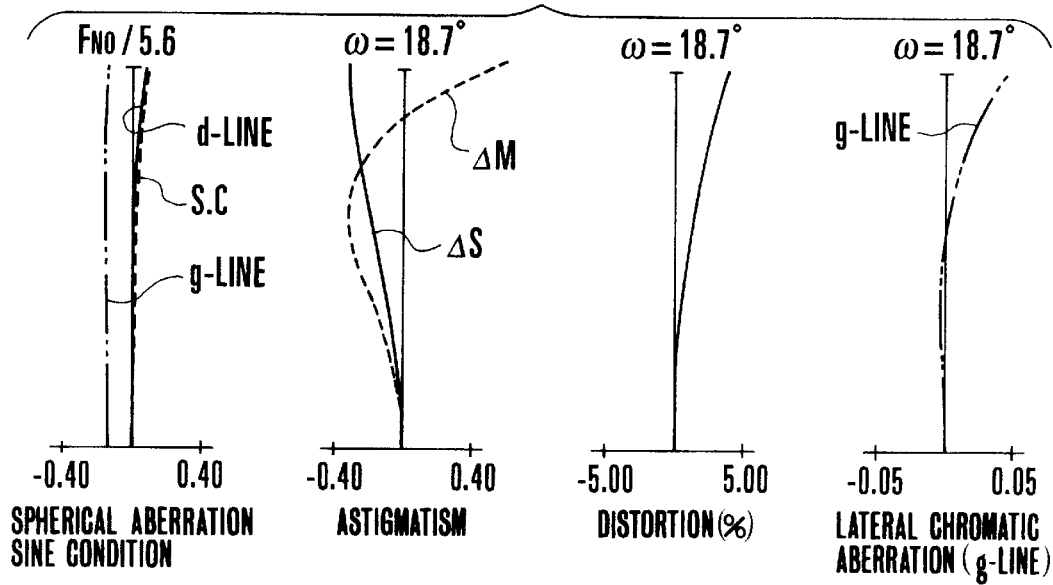
Figure 7C:
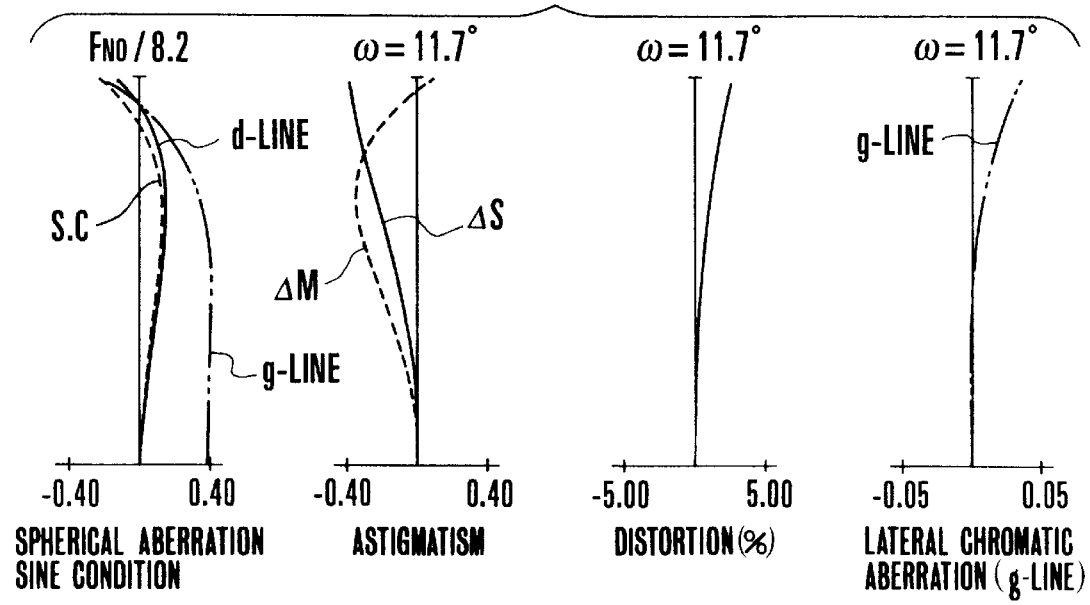
Figure 8A:
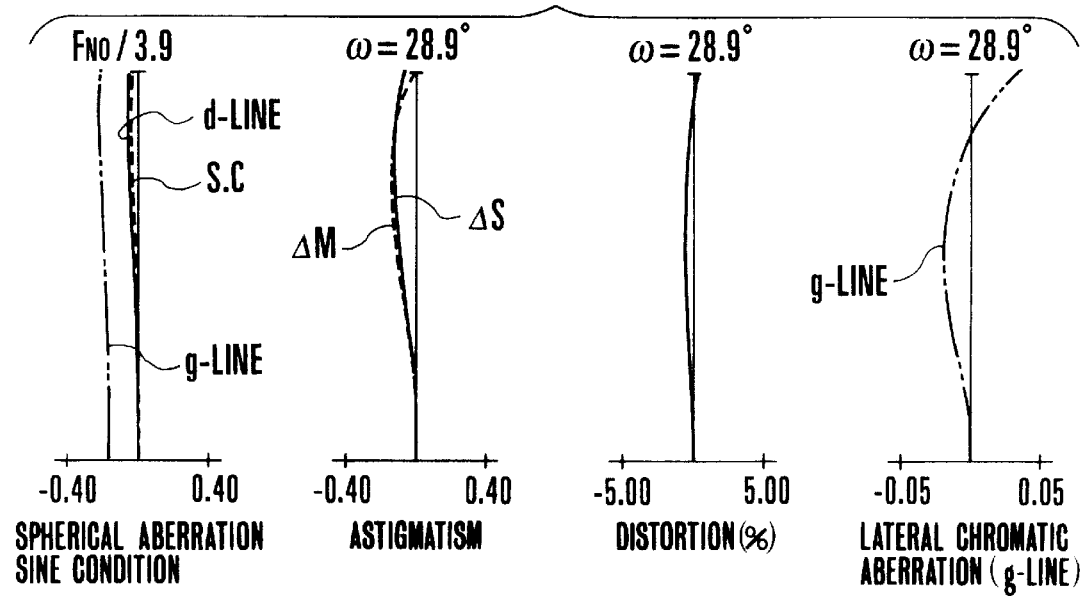
FIGS. 8(A), 8(B) and 8(C) are graphic representations of the aberrations of the numerical example 2 of the invention.
Figure 8B:
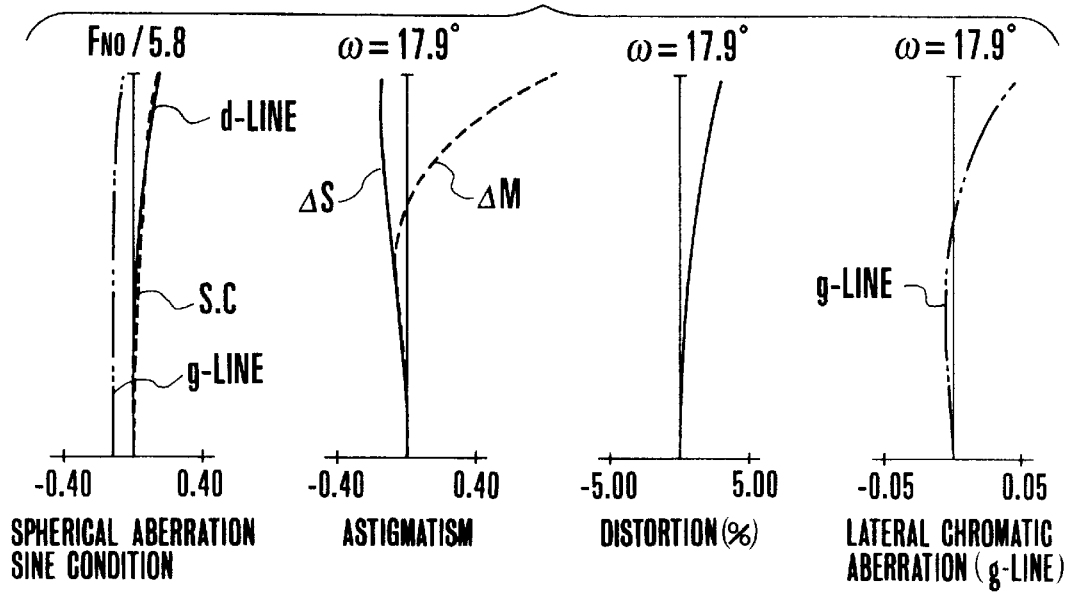
Figure 8C:
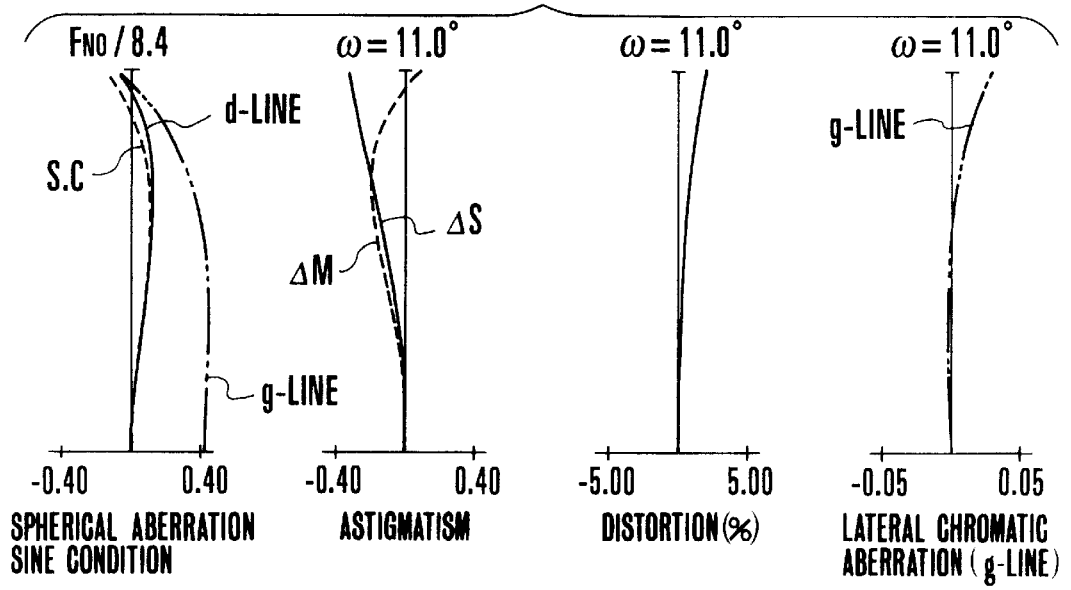
Figure 9A:
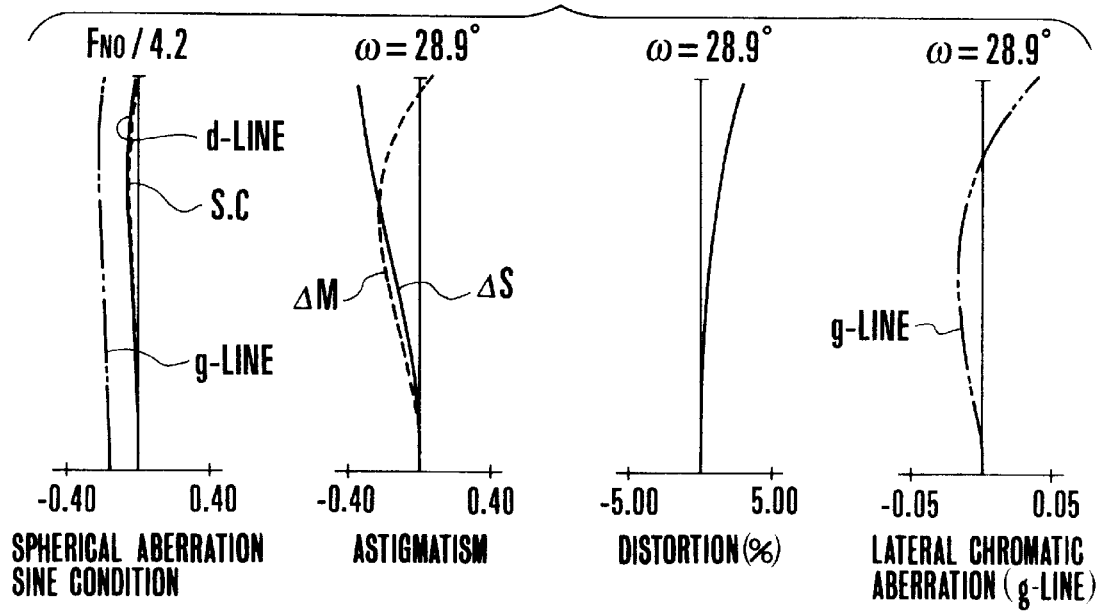
FIGS. 9(A), 9(B) and 9(C) are graphic representations of the aberrations of the numerical example 3 of the invention.
Figure 9B:
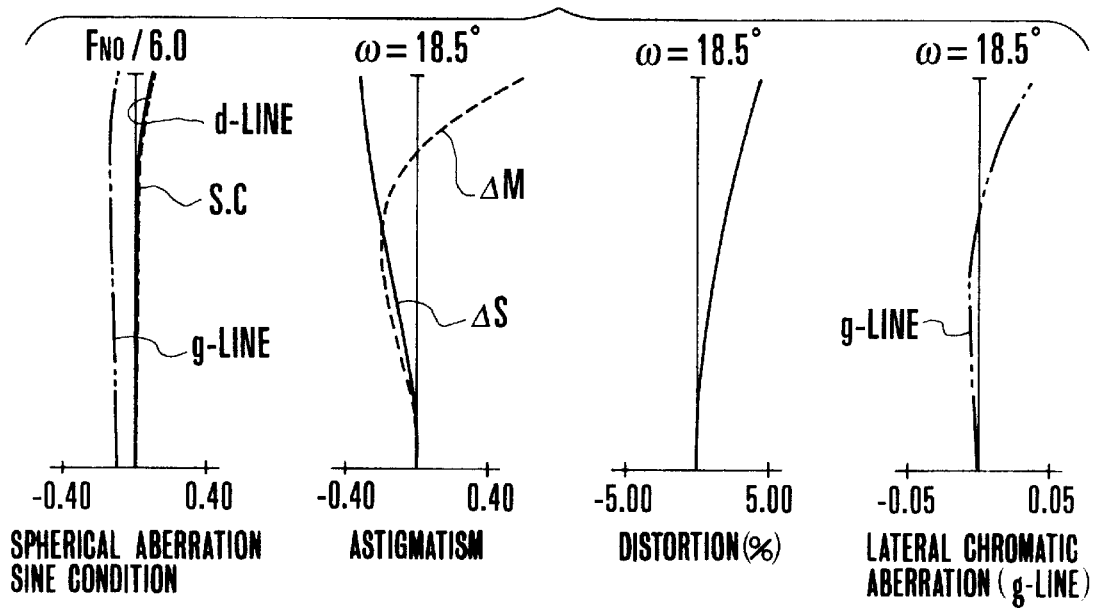
Figure 9C:
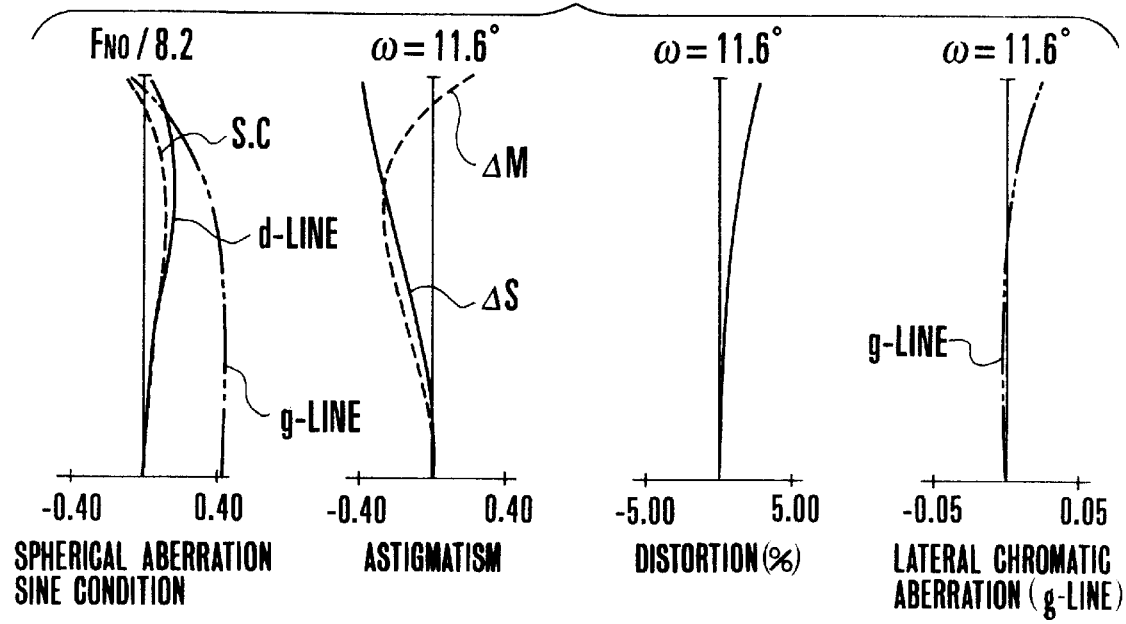
Figure 10A:
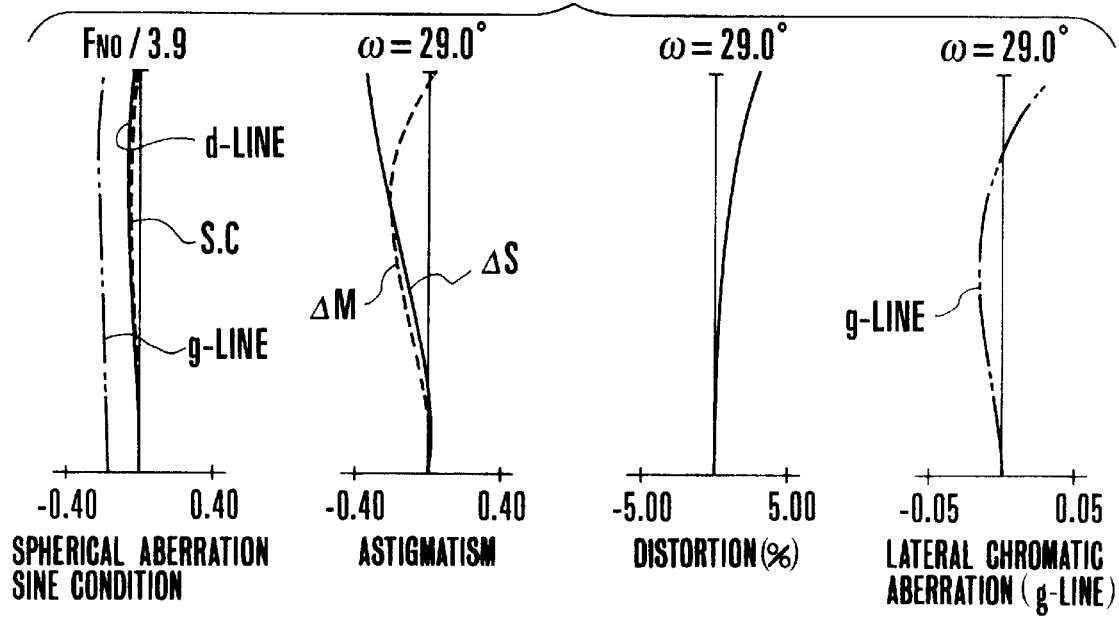
FIGS. 10(A), 10(B) and 10(C) are graphic representations of the aberrations of the numerical example 4 of the invention.
Figure 10B:
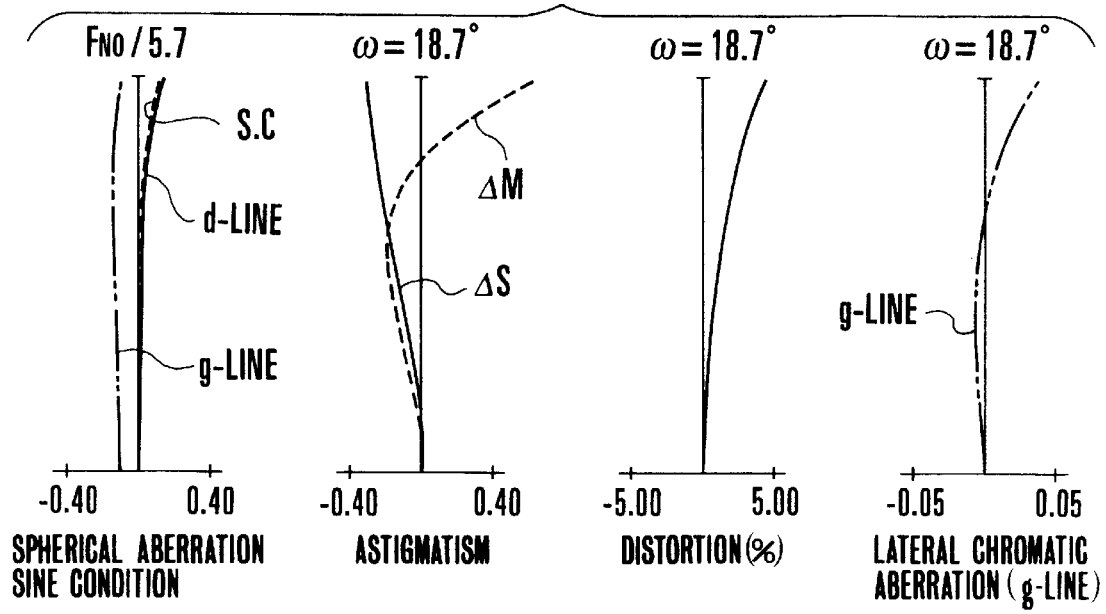
Figure 10C:
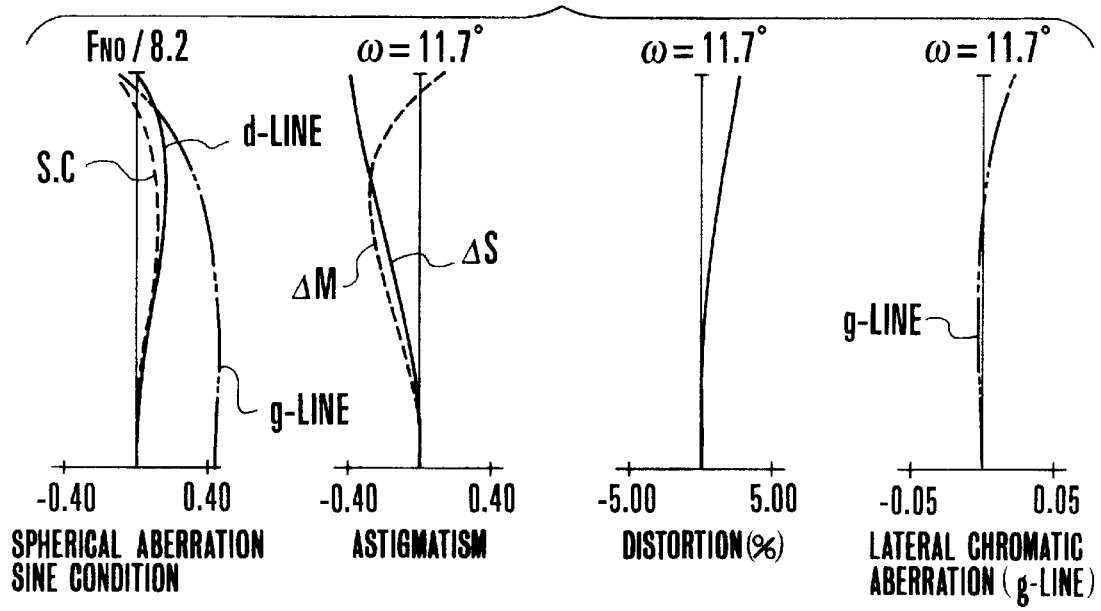
Figure 11A:
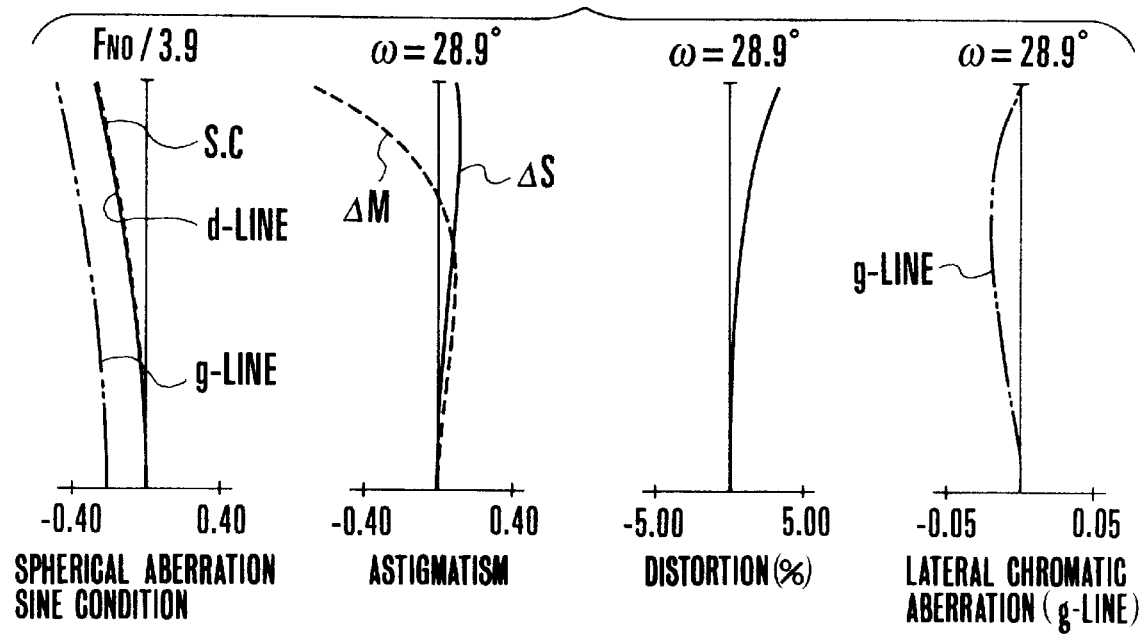
FIGS. 11(A), 11(B) and 11(C) are graphic representations of the aberrations of the numerical example 5 of the invention.
Figure 11B:
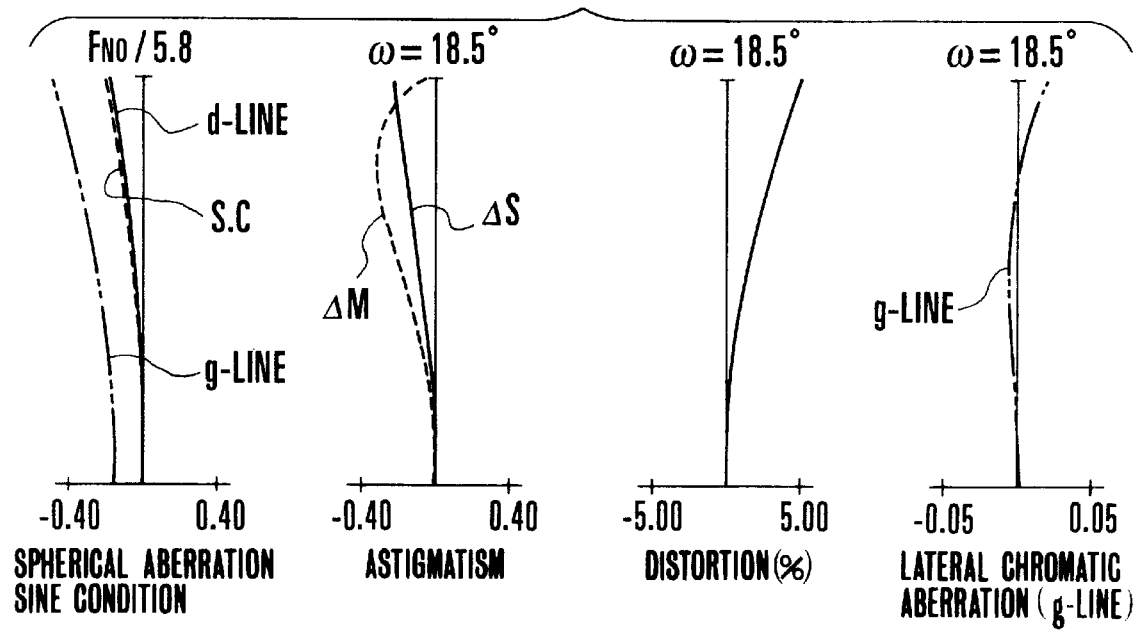
Figure 11C:
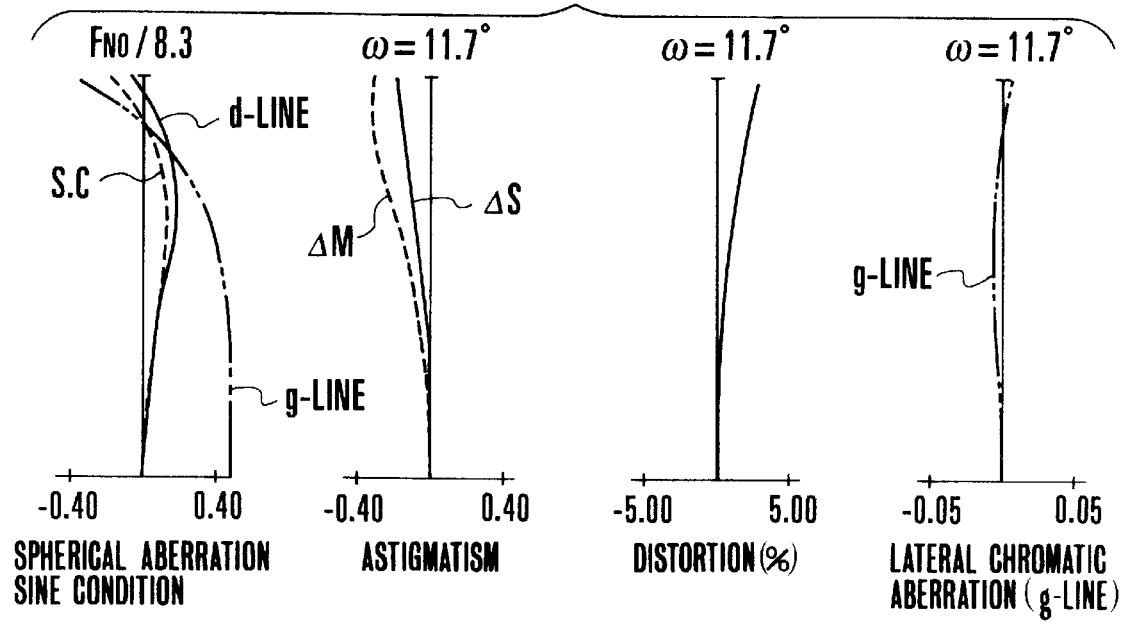
Figure 12A:
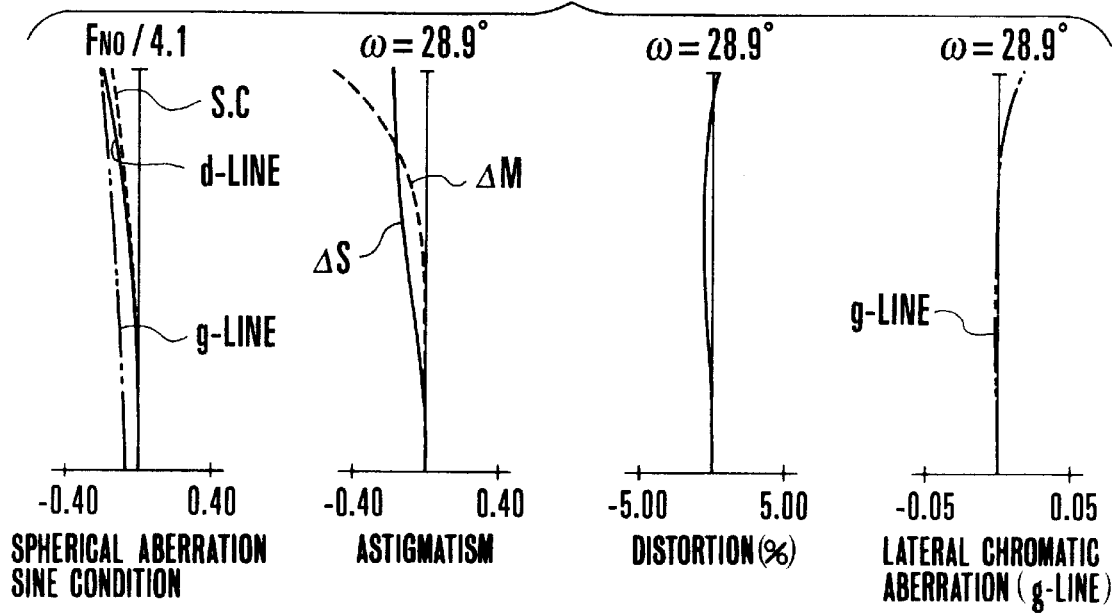
FIGS. 12(A), 12(B) and 12(C) are graphic representations of the aberrations of the numerical example 6 of the invention.
Figure 12B:
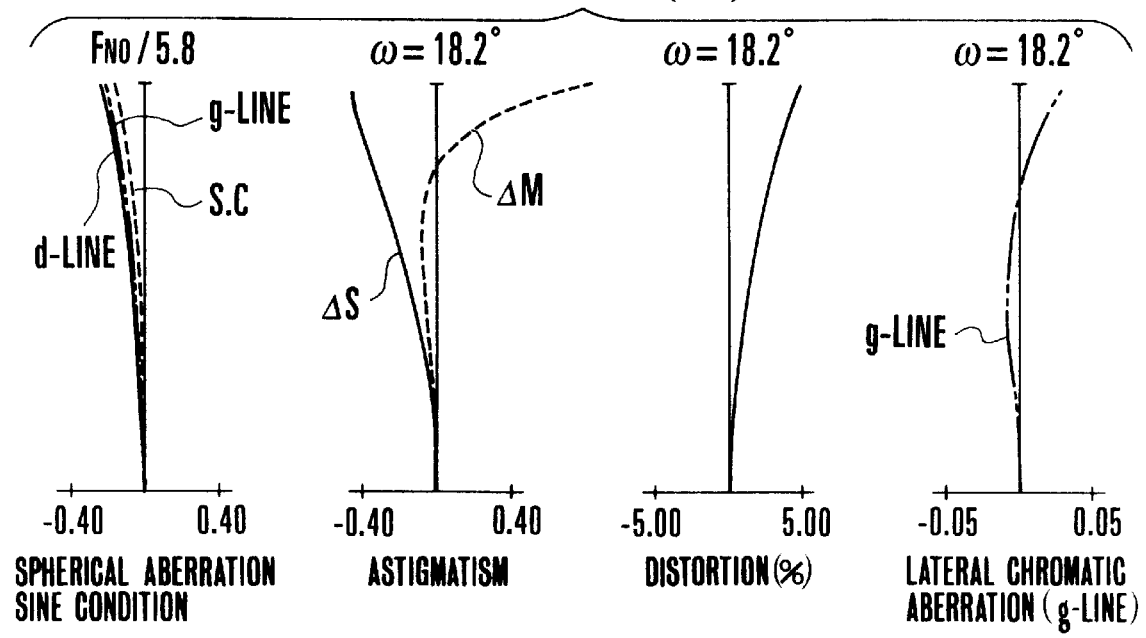
Figure 12C:
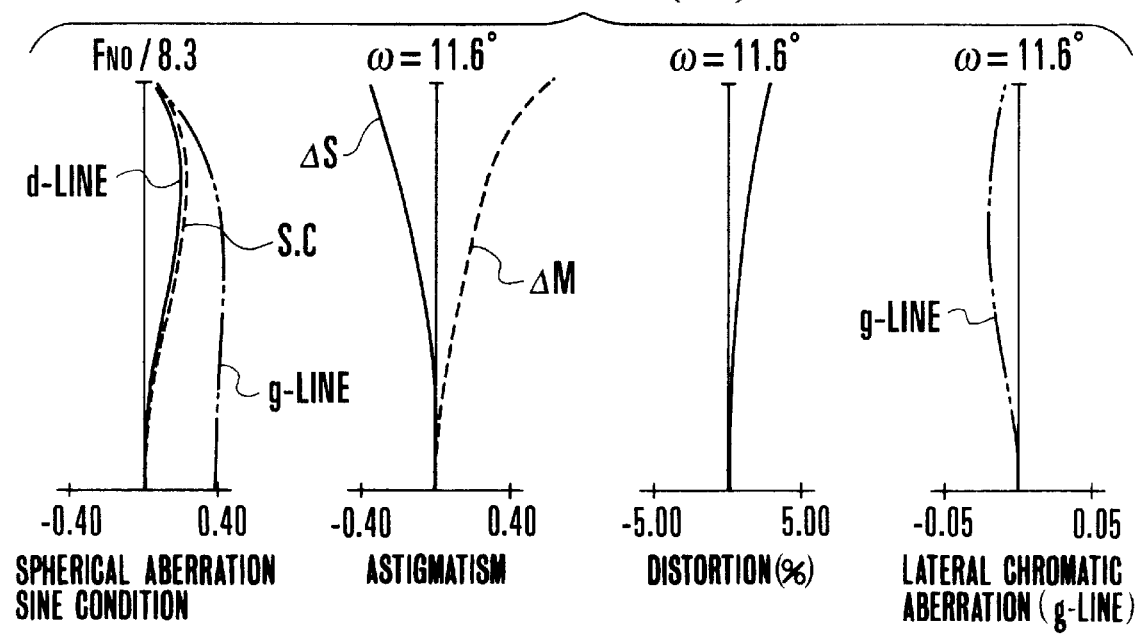

FIGS. 1 to 6 in block diagram show zoom lenses of the invention in the wide-angle end for the numerical examples 1 to 6 to be described later. FIGS. 7(A), 7(B) and 7(C) through FIGS. 12(A), 12(B) and 12(C) show the aberrations of the zoom lenses shown in FIGS. 1 to 6. The suffixes (A), (B) and (C) to the figure numbers denote the wide-angle end, a middle position and the telephoto end, respectively.

In these figures, reference character L1 denotes a first lens unit of positive refractive power, reference character L2 denotes a second lens unit of positive refractive power, reference character L3 denotes a third lens unit of negative refractive power, and reference character SP denotes a stop.

The shown arrows indicate the loci of movement of the respective lens units as zooming goes from the wide-angle end to the telephoto end.

For the zoom lens according to the invention, zooming from the wide-angle end to the telephoto end is made to operate by determining the refractive powers of the first to third lens units so appropriately that, as shown in each of the lens block diagrams, the first to third lens units all move forward in such relation that the air separation between the first and second lens units increases and the air separation between the second and third lens units decreases.

By this, the second and third lens units are allowed to take respective shares of the function of varying the focal length, so that the desired zoom ratio is secured with ease. In addition, the variation with zooming of the aberrations is minimized. Thus, a zoom lens of high optical performance is obtained.

Such forward movement of all the lens units as zooming from the wide-angle end to the telephoto end also permits the total length of the entire lens system in the wide-angle end to be shortened advantageously.

Specifically, a refractive power arrangement to be used is for the total length to get shorter on the wide-angle side and longer on the telephoto side.

Focusing is performed, in the numerical examples 1, 2, 5 and 6, by moving the second lens unit. In the numerical example 4, the first and second lens units are moved in unison, thereby obviating creation of a space for the focusing purposes in between the first and second lens units. In the numerical example 3, the first lens unit is moved, thereby simplifying the operating mechanism.

The first lens unit is made up from at least one negative lens as a first one and at least one positive lens as a second one. Thus, the chromatic aberrations the first lens unit produces are well corrected throughout the entire zooming range.

In the 3-unit zoom lens according to the invention, the lens configuration is made such that, of the various aberrations produced in the first lens unit of positive refractive power during zooming, the spherical aberration and coma are especially corrected by the third lens unit of negative refractive power.

For this reason, the second lens unit is so constructed that it does not produce spherical aberration and coma as far as possible.

For this reason, in the numerical examples 1 and 6, the second lens unit is constructed from a negative first lens having a concave surface (lens surface A) facing the object side, a positive second lens, and a cemented lens composed of a negative third lens having a concave surface facing the image side and a positive fourth lens having both surfaces convex (the surface on the image side being taken as the lens surface B) (the cemented surface being taken as the lens surface C).

In this construction, the positive spherical aberration and coma produced from the lens surface A are corrected by the lens surface B, and the residual aberrations produced from the other lens surfaces are corrected by the lens surface C.

In addition, the second and third lens units are made to satisfy the before-described condition (1) for their lateral magnifications. This permits the zooming range to be increased in such a manner that the various aberrations are well corrected.

When the upper limit of the condition (1) is exceeded, the refractive power of each lens unit gets weaker, causing the total length of the complete lens to increase largely. When the lower limit is exceeded, the negative refractive power of the third lens unit must be strengthened in order to secure a predetermined back focal distance. Then, large aberrations of higher order are disadvantageously produced.

Further, it is more preferable to set the lower limit of the condition (1) to 0.2.

In the other numerical examples 2, 3, 4 and 5, the second lens unit is made up from a cemented lens composed of a negative first lens having a concave surface facing the object side and a positive second lens, and another cemented lens composed of a negative third lens having a concave surface facing the image side and a positive fourth lens having both surfaces convex.

By this, while reducing the relative decenter due to the manufacturing errors of the first and second lenses, similar results to those of the numerical examples 1 and 6 are attained.

It should be noted that, even in the numerical examples 2, 3, 4 and 5, it is preferable to satisfy the above-described condition (1). Accordingly, similar results to those of the numerical examples 1 and 6 are attained.

Besides these, according to the invention, it is preferable to set forth various parameters as follows:

To obtain high optical performance throughout the entire zooming range with the limitation of the bulk and size of the entire lens system to a minimum, the following conditions are satisfied:

$$f_2/f_W < 1.25 \tag{2}$$

$$0.6 < |1/(\phi_{2-1} \cdot f_2)| \tag{3}$$

where $f_2$ is the focal length of the second lens unit, $f_W$ is the shortest focal length of the entire lens system, and $\phi_{2-1}$ is the refracting power of a frontmost lens surface in the second lens unit.

The inequalities of condition (2) are concerned with the ratio of the refractive power of the second lens unit to the focal length for the wide-angle end of the entire lens system. When the upper limit of the condition (2) is exceeded, as this means that the refractive power is too weak, the total length of the complete lens comes to increase and the diameter of the first lens unit becomes larger.

Meanwhile, it is preferable to set the lower limit of the condition (2) to 0.75 or thereabout, and when the refractive power of the second lens unit is too strong as exceeding the lower limit of the condition (2), the back focal distance is liable to become short. As a result, the diameter of the third lens unit increases and the off-axial aberrations produced by it become difficult to correct. So, that violation is not favorable.

The factor in the condition (3) represents the ratio of the refracting power of the frontmost lens surface (lens surface A) in the second lens unit to the focal length for the wide-angle end, and the inequalities of condition (3) have an aim chiefly to well correct spherical aberration and coma.

Further, it is more preferable to set the upper limit of the condition (3) to 1.15 or thereabout.

When the upper limit of the condition (3) is exceeded, as this means that the refracting power of the lens surface A is too weak, outward coma is liable to arise. On the other hand, when the refracting power of the lens surface A is too strong as exceeding the lower limit, over-correction of spherical aberration results. So, even if an aspheric surface is introduced into the second lens unit, it will be difficult to correct the above-described various aberrations in good balance.

In the zoom lens of the present embodiment, it is preferable to put the stop SP in an air spacing of from the rearmost lens surface of the first lens unit to the frontmost lens surface of the second lens unit. By this, the illumination in the corners of the image frame can be maintained above a certain level, and it becomes also possible to correct the on-axial and off-axial aberrations in good balance.

In the present embodiment, the stop SP is preferably made movable in unison with the second lens unit as zooming goes on. Accordingly, the operating mechanism can be simplified in structure.

In the present embodiment, if focusing is performed by moving the second lens unit, it is preferable to make the stop stationary. By this, a further simplification of the operating mechanism is achieved.

In the present embodiment, to maintain good optical performance over the entire area of the image frame, it is preferable to apply an aspheric sphere to the rearmost surface of the second lens unit. According to this aspheric sphere, the positive spherical aberration and off-axial aberrations the frontmost lens surface (the lens surface A) of the second lens unit produces can be corrected well.

To reduce the variation of chromatic aberrations throughout the entire zooming range for obtaining high optical performance, letting the refractive index and Abbe number of the materials of the i-th lens element in the second lens unit be denoted by $N_{2-i}$ and $v_{2-i}$, respectively, it is preferable to satisfy the following conditions:

$$0.1 < N_{2-3} - N_{2-4} \tag{4}$$

$$25 < v_{2-4} - v_{2-3} \tag{5}$$

$$35 < (v_{2-1} + v_{2-2})/2 < 60 \tag{6}$$

The inequality of condition (4) is concerned with the difference between the refractive indices of the materials of the third and fourth lenses constituting the cemented lens in the second lens unit.

When the lower limit is exceeded, as this means the refractive index difference is too small, the curvature of the cemented surface must be strengthened in order to maintain the constant refracting power of the cemented surface. As a result, large spherical aberrations of higher order are produced.

Also, to secure a certain edge thickness at the trim diameter of the positive fourth lens of the second lens unit, the axial thickness becomes too thick, causing the total length of the complete lens to become long objectionably.

The inequalities of conditions (5) and (6) give proper ranges for the Abbe numbers of the materials of all the lenses constituting the second lens unit and have an aim chiefly to well correct the variation of chromatic aberrations with zooming.

When the conditions (5) and (6) are violated, the range of variation of chromatic aberrations with zooming increases objectionably.

As to the third lens unit, it is preferable from the standpoint of aberration correction to make it up from a positive first lens of meniscus form convex toward the image side and at least one negative lens of meniscus form concave toward the object side in this order from the object side.

To apply at least one aspheric surface to the third lens unit is preferable because high optical performance is obtained easily.

Next, numerical examples 1 to 6 of the invention are shown. In the numerical data for the examples 1 to 6, Ri is the radius of curvature of the i-th lens surface, when counted from the object side, Di is the i-th axial lens thickness or air separation, when counted from the object side, and Ni and vi are respectively the refractive index and Abbe number of the glass of the i-th lens element, when counted from the object side.

Also, the relationship of the above-described conditions (1) to (6) with the various numeral values in the numerical examples 1 to 6 is shown in Table-1.

The shape of an aspheric surface is expressed in the coordinates with an X axis in the axial direction and an H axis in the direction perpendicular to the optical axis, the direction in which light advances being taken as positive by the following equation:

$$X = (1/R)H^2/(1 + \sqrt{1 - (1+K)(H/R)^2}) + AH^2 + BH^4 + CH^6 + DH^8 + EH^{10}$$

where R is the radius of the osculating sphere, and K, A, B, C, D and E are the aspheric coefficients.

Numerical Example 1:

| f = 39.14–104.88 | Fno = 1:4.1–8.2 | 2ω = 57.9°–23.3° | |
|---|---|---|---|
| R 1 = 29.11 | D 1 = 1.30 | N 1 = 1.84666 | ν 1 = 23.9 |
| R 2 = 22.29 | D 2 = 0.50 | | |
| R 3 = 18.14 | D 3 = 2.30 | N 2 = 1.48749 | ν 2 = 70.2 |
| R 4 = 102.18 | D 4 = Variable | | |
| R 5 = ∞ (Stop) | D 5 = 2.10 | | |
| R 6 = −15.71 | D 6 = 2.45 | N 3 = 1.48749 | ν 3 = 70.2 |
| R 7 = 165.20 | D 7 = 1.00 | | |
| R 8 = 155.07 | D 8 = 2.50 | N 4 = 1.80518 | ν 4 = 25.4 |
| R 9 = −39.18 | D 9 = 2.50 | | |
| R10 = 31.52 | D10 = 1.40 | N 5 = 1.84666 | ν 5 = 23.9 |
| R11 = 13.51 | D11 = 4.80 | N 6 = 1.58313 | ν 6 = 59.4 |
| R12 = −24.33 | D12 = Variable | | |
| R13 = −25.09 | D13 = 2.50 | N 7 = 1.84666 | ν 7 = 23.8 |
| R14 = −17.97 | D14 = 0.20 | | |
| R15 = −25.89 | D15 = 1.40 | N 8 = 1.71300 | ν 8 = 53.8 |
| R16 = −188.79 | D16 = 4.26 | | |
| R17 = −19.44 | D17 = 1.70 | N 9 = 1.72000 | ν 9 = 50.3 |
| R18 = −88.56 | | | |

| Variable | Focal Length | | |
|---|---|---|---|
| Separation | 39.14 | 64.06 | 104.88 |
| D 4 | 3.06 | 10.06 | 15.42 |
| D12 | 13.53 | 6.39 | 1.25 |

R12: Aspheric Surface

| K = −3.38 × 10⁻¹ | A = 0 | B = 1.03 × 10⁻⁵ |
|---|---|---|
| C = −3.79 × 10⁻⁸ | D = 1.22 × 10⁻⁹ | E = −2.83 × 10⁻¹¹ |

Numerical Example 2:

| f = 39.18–111.77 | Fno = 1:3.9–8.4 | 2ω = 57.8°–21.9° | |
|---|---|---|---|
| R 1 = 34.66 | D 1 = 1.40 | N 1 = 1.84666 | ν 1 = 23.8 |
| R 2 = 26.82 | D 2 = 0.70 | | |
| R 3 = 21.75 | D 3 = 2.40 | N 2 = 1.48749 | ν 2 = 70.2 |
| R 4 = 122.57 | D 4 = Variable | | |
| R 5 = ∞ (Stop) | D 5 = 1.60 | | |
| R 6 = −15.65 | D 6 = 1.20 | N 3 = 1.48749 | ν 3 = 70.2 |
| R 7 = −123.22 | D 7 = 7.38 | N 4 = 1.80518 | ν 4 = 25.4 |
| R 8 = −31.96 | D 8 = 2.92 | | |
| R 9 = 34.05 | D 9 = 1.10 | N 5 = 1.84666 | ν 5 = 23.8 |
| R10 = 15.62 | D10 = 4.20 | N 6 = 1.58313 | ν 6 = 59.4 |
| R11 = −27.85 | D11 = Variable | | |
| R12 = −31.89 | D12 = 2.60 | N 7 = 1.84666 | ν 7 = 23.8 |
| R13 = −21.55 | D13 = 0.15 | | |
| R14 = −34.99 | D14 = 1.40 | N 8 = 1.71300 | ν 8 = 53.8 |
| R15 = −365.81 | D15 = 4.32 | | |
| R16 = −21.61 | D16 = 1.70 | N 9 = 1.74320 | ν 9 = 49.3 |
| R17 = −129.80 | | | |

| Variable | Focal Length | | |
|---|---|---|---|
| Separation | 39.18 | 66.96 | 111.77 |
| D 4 | 3.65 | 13.61 | 21.50 |
| D11 | 16.20 | 7.26 | 1.09 |

R11: Aspheric Surface:

| K = −5.38 × 10⁻¹ | A = 0 | B = 5.91 × 10⁻⁶ |
|---|---|---|
| C = −4.58 × 10⁻⁸ | D = 1.07 × 10⁻⁹ | E = −1.73 × 10⁻¹¹ |

Numerical Example 3:

| f = 39.14–105.77 | Fno = 1:4.2–8.2 | 2ω = 57.9°–23.1° | |
|---|---|---|---|
| R 1 = 26.46 | D 1 = 1.20 | N 1 = 1.80518 | ν 1 = 25.4 |
| R 2 = 17.89 | D 2 = 0.50 | | |
| R 3 = 17.06 | D 3 = 4.00 | N 2 = 1.63854 | ν 2 = 55.4 |
| R 4 = 98.66 | D 4 = Variable | | |
| R 5 = ∞ (Stop) | D 5 = 2.10 | | |
| R 6 = −17.48 | D 6 = 1.50 | N 3 = 1.71700 | ν 3 = 47.9 |
| R 7 = 8.80 | D 7 = 7.86 | N 4 = 1.64769 | ν 4 = 33.8 |
| R 8 = −23.57 | D 8 = 0.20 | | |
| R 9 = 31.87 | D 9 = 1.20 | N 5 = 1.84666 | ν 5 = 23.9 |
| R10 = 13.28 | D10 = 5.40 | N 6 = 1.58313 | ν 6 = 59.4 |
| R11 = −22.13 | D11 = Variable | | |
| R12 = −31.89 | D12 = 2.80 | N 7 = 1.84666 | ν 7 = 23.8 |
| R13 = −21.36 | D13 = 0.20 | | |
| R14 = −27.64 | D14 = 1.50 | N 8 = 1.72000 | ν 8 = 50.3 |
| R15 = 2438.66 | D15 = 5.12 | | |
| R16 = −20.66 | D16 = 1.80 | N 9 = 1.58913 | ν 9 = 61.2 |
| R17 = −132.61 | | | |

| Variable | Focal Length | | |
|---|---|---|---|
| Separation | 39.14 | 64.62 | 105.77 |
| D 4 | 1.80 | 8.14 | 15.24 |
| D11 | 16.85 | 8.76 | 2.38 |

R11: Aspheric Surface:

| | | |
|---|---|---|
| $K = -4.00 \times 10^{-1}$ | $A = 0$ | $B = -1.75 \times 10^{-5}$ |
| $C = -5.74 \times 10^{-8}$ | $D = -2.55 \times 10^{-9}$ | $E = -6.06 \times 10^{-12}$ |

Numerical Example 4:

$f = 39.06–104.84$  $Fno = 1:3.9–8.2$  $2\omega = 58.0°–23.3°$

| | | | |
|---|---|---|---|
| R 1 = 35.02 | D 1 = 1.50 | N 1 = 1.84666 | ν 1 = 23.9 |
| R 2 = 25.51 | D 2 = 1.00 | | |
| R 3 = 20.46 | D 3 = 2.50 | N 2 = 1.48749 | ν 2 = 70.2 |
| R 4 = 265.87 | D 4 = Variable | | |
| R 5 = ∞ (Stop) | D 5 = 2.00 | | |
| R 6 = −16.10 | D 6 = 1.20 | N 3 = 1.48749 | ν 3 = 70.2 |
| R 7 = −1040.16 | D 7 = 6.32 | N 4 = 1.80518 | ν 4 = 25.4 |
| R 8 = −34.42 | D 8 = 3.39 | | |
| R 9 = 36.62 | D 9 = 1.10 | N 5 = 1.84666 | ν 5 = 23.9 |
| R10 = 15.45 | D10 = 4.80 | N 6 = 1.58313 | ν 6 = 59.4 |
| R11 = −25.96 | D11 = Variable | | |
| R12 = −27.16 | D12 = 2.60 | N 7 = 1.84666 | ν 7 = 23.8 |
| R13 = −19.14 | D13 = 0.15 | | |
| R14 = −30.97 | D14 = 1.40 | N 8 = 1.71300 | ν 8 = 53.8 |
| R15 = −167.29 | D15 = 4.67 | | |
| R16 = −18.94 | D16 = 1.70 | N 9 = 1.74320 | ν 9 = 49.3 |
| R17 = −95.35 | | | |

| Variable Separation | Focal Length | | |
|---|---|---|---|
| | 39.06 | 64.01 | 104.84 |
| D 4 | 1.20 | 9.36 | 15.38 |
| D11 | 14.66 | 6.83 | 1.14 |

R11: Aspheric Surface:

| | | |
|---|---|---|
| $K = -1.22 \times 10^{-1}$ | $A = 0$ | $B = 9.94 \times 10^{-6}$ |
| $C = -8.00 \times 10^{-9}$ | $D = 7.15 \times 10^{-10}$ | $E = -1.31 \times 10^{-11}$ |

Numerical Example 5:

$f = 39.17–104.86$  $Fno = 1:3.9–8.3$  $2\omega = 57.8°–23.3°$

| | | | |
|---|---|---|---|
| R 1 = −46.00 | D 1 = 1.20 | N 1 = 1.80518 | ν 1 = 25.4 |
| R 2 = −88.96 | D 2 = 0.15 | | |
| R 3 = 31.29 | D 3 = 3.00 | N 2 = 1.48749 | ν 2 = 70.2 |
| R 4 = −71.32 | D 4 = Variable | | |
| R 5 = ∞ (Stop) | D 5 = 2.00 | | |
| R 6 = −19.63 | D 6 = 0.60 | N 3 = 1.60311 | ν 3 = 60.7 |
| R 7 = 13.63 | D 7 = 1.75 | N 4 = 1.83400 | ν 4 = 37.2 |
| R 8 = 142.88 | D 8 = 4.14 | | |
| R 9 = 25.17 | D 9 = 1.10 | N 5 = 1.72825 | ν 5 = 28.5 |
| R10 = 11.07 | D10 = 4.80 | N 6 = 1.58313 | ν 6 = 59.4 |
| R11 = −24.07 | D11 = Variable | | |
| R12 = −17.15 | D12 = 3.20 | N 7 = 1.84666 | ν 7 = 23.8 |
| R13 = −15.91 | D13 = 3.40 | | |
| R14 = −18.92 | D14 = 1.70 | N 8 = 1.71300 | ν 8 = 53.8 |
| R15 = 453.50 | | | |

| Variable Separation | Focal Length | | |
|---|---|---|---|
| | 39.17 | 64.84 | 104.86 |
| D 4 | 4.06 | 11.04 | 17.17 |
| D11 | 17.37 | 7.76 | 1.14 |

R11: Aspheric Surface:

| | | |
|---|---|---|
| $K = 1.87 \times 10^{-1}$ | $A = 0$ | $B = 3.85 \times 10^{-5}$ |
| $C = 1.35 \times 10^{-8}$ | $D = 8.86 \times 10^{-11}$ | $E = 6.34 \times 10^{-12}$ |

Numerical Example 6:

$f = 39.14–105.02$  $Fno = 1:4.1–8.3$  $2\omega = 57.8°–23.3°$

| | | | |
|---|---|---|---|
| R 1 = −91.94 | D 1 = 1.20 | N 1 = 1.84666 | ν 1 = 23.8 |
| R 2 = −630.47 | D 2 = 0.15 | | |
| R 3 = 26.37 | D 3 = 2.50 | N 2 = 1.48749 | ν 2 = 70.2 |
| R 4 = −129.17 | D 4 = Variable | | |
| R 5 = ∞ (Stop) | D 5 = 1.40 | | |
| R 6 = −18.04 | D 6 = 0.70 | N 3 = 1.48749 | ν 3 = 70.2 |
| R 7 = 19.12 | D 7 = 1.00 | | |
| R 8 = 18.05 | D 8 = 1.70 | N 4 = 1.80518 | ν 4 = 25.4 |
| R 9 = 67.41 | D 9 = 3.35 | | |
| R10 = 24.37 | D10 = 1.00 | N 5 = 1.84666 | ν 5 = 23.8 |
| R11 = 10.88 | D11 = 4.70 | N 6 = 1.58313 | ν 6 = 59.4 |
| R12 = −21.46 | D12 = Variable | | |
| R13 = −22.50 | D13 = 3.20 | N 7 = 1.84666 | ν 7 = 23.8 |
| R14 = −16.87 | D14 = 0.83 | | |
| R15 = −17.99 | D15 = 1.30 | N 8 = 1.71300 | ν 8 = 53.8 |
| R16 = 258.80 | | | |

| Variable Separation | Focal Length | | |
|---|---|---|---|
| | 39.14 | 65.67 | 105.02 |
| D 4 | 3.26 | 12.73 | 17.82 |
| D12 | 19.39 | 8.35 | 1.09 |

R12: Aspheric Surface:

| | | |
|---|---|---|
| $K = 0$ | $A = 0$ | $B = 3.05 \times 10^{-5}$ |
| $C = -4.33 \times 10^{-8}$ | $D = 1.09 \times 10^{-13}$ | $E = -7.96 \times 10^{-16}$ |

TABLE 1

| | Numerical Example | | | | | |
|---|---|---|---|---|---|---|
| Condition | 1 | 2 | 3 | 4 | 5 | 6 |
| (1) $\beta_{2W}/\beta_{B3W}$ | 0.28 | 0.27 | 0.37 | 0.29 | 0.34 | 0.34 |
| (2) $f_2/f_W$ | 0.85 | 0.87 | 0.91 | 0.91 | 1.03 | 1.07 |
| (3) $1/(\phi_{2-1} \cdot f_2)$ | 0.97 | 0.94 | 0.69 | 0.93 | 0.81 | 0.77 |
| (4) $N_{2-3} - N_{2-4}$ | 0.26 | 0.26 | 0.26 | 0.26 | 0.15 | 0.15 |
| (5) $\nu_{2-4} - \nu_{2-3}$ | 35.5 | 35.5 | 35.5 | 35.5 | 30.9 | 30.9 |
| (6) $(\nu_{2-1} + \nu_{2-2})/2$ | 47.8 | 47.8 | 40.85 | 47.8 | 48.95 | 48.95 |

According to the embodiment of the invention, as three lens units are in use as a whole, by setting forth appropriate rules of design for each of the lens units, and by moving the lens units in proper relation during zooming, it is made possible to achieve a compact zoom lens whose range is 2.7–2.85 or thereabout and F-number, nonetheless, about 3.9–8.3 and which maintains good optical performance over the entire zooming range and is short in the total length of the entire system with the total number of lens elements being 8–9 or thereabout.

Another embodiment of a zoom lens according to the invention in which improvements have been made is described below.

Figure 13A:
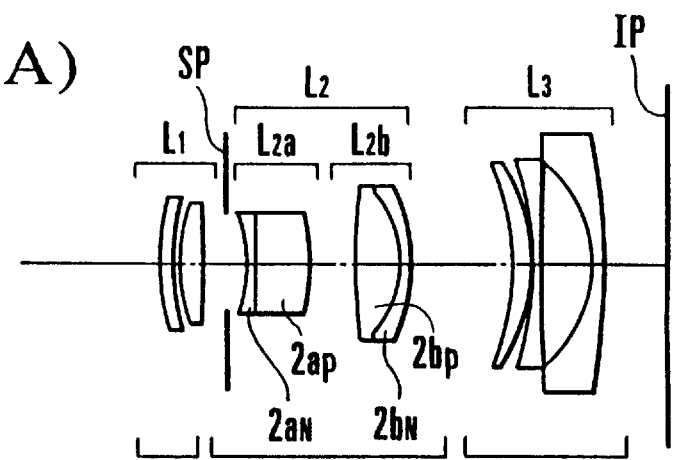
FIGS. 13(A), 13(B) and 13(C) are longitudinal section views of a numerical example 7 of the zoom lens of the invention.
Figure 13B:
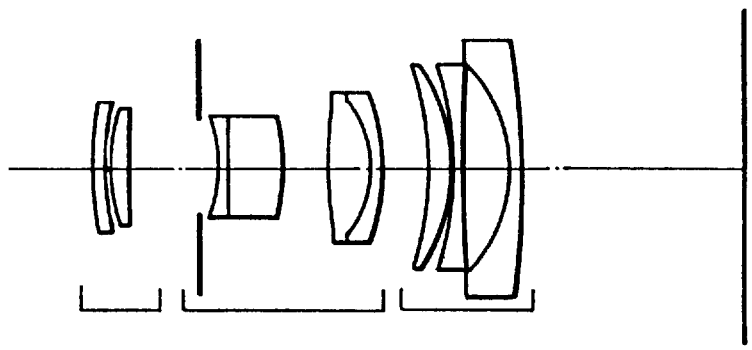
Figure 13C:
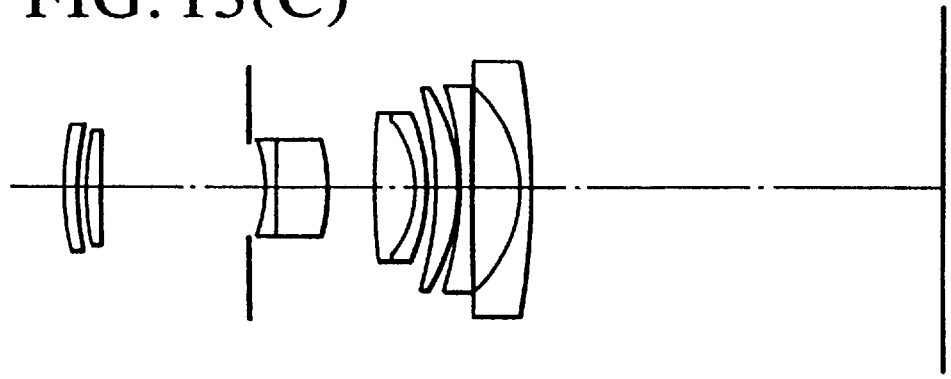
Figure 14:
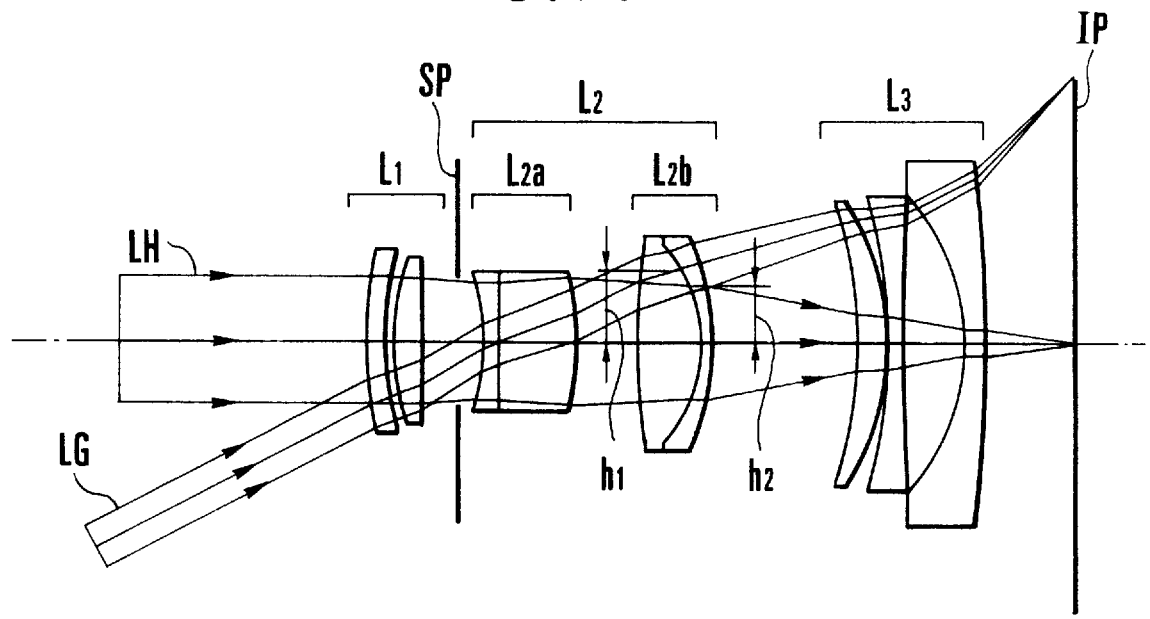
FIG. 14 is a diagram of geometry showing the path of light beams through the zoom lens shown in FIGS. 13(A), 13(B) and 13(C).
Figure 15:
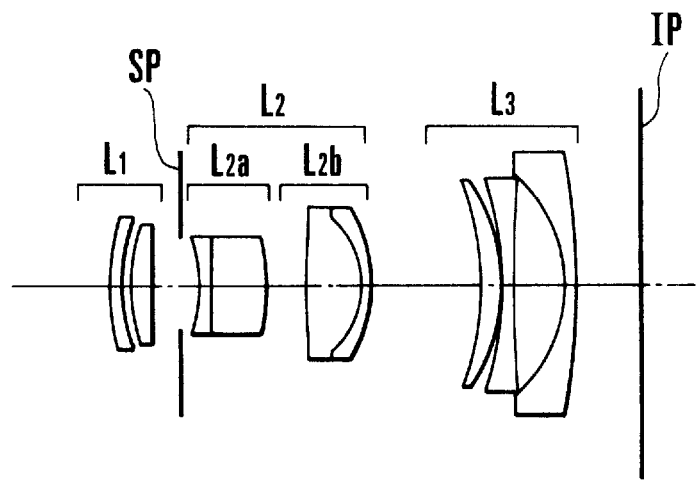
FIG. 15 is a longitudinal section view of a numerical example 8 of the zoom lens of the invention.
Figure 16:
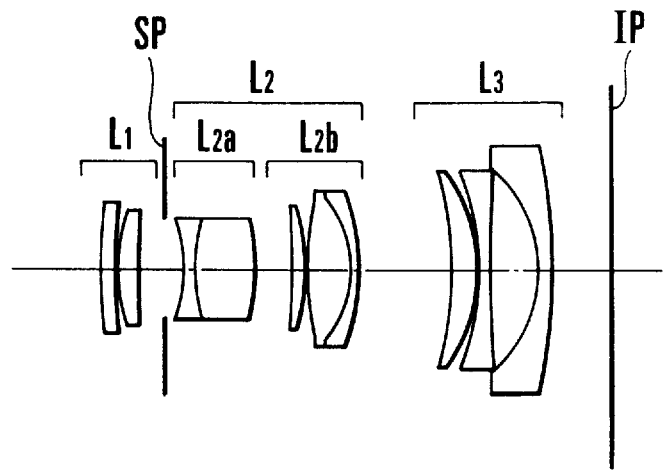
FIG. 16 is a longitudinal section view of a numerical example 9 of the zoom lens of the invention.
Figure 17:
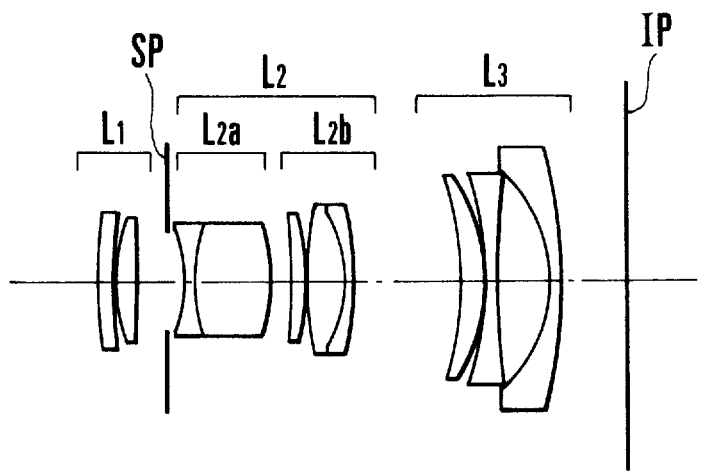
FIG. 17 is a longitudinal section view of a numerical example 10 of the zoom lens of the invention.
Figure 18A:
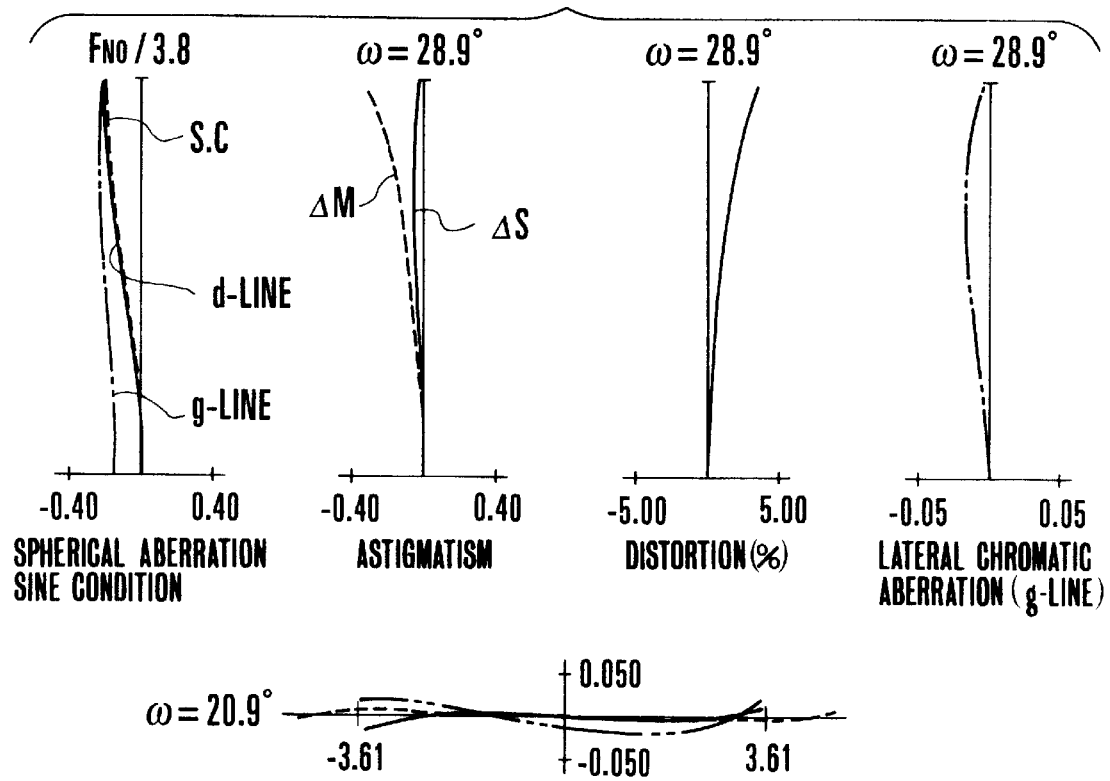
FIGS. 18(A), 18(B) and 18(C) are graphic representations of the aberrations of the numerical example 7 of the invention.
Figure 18B:
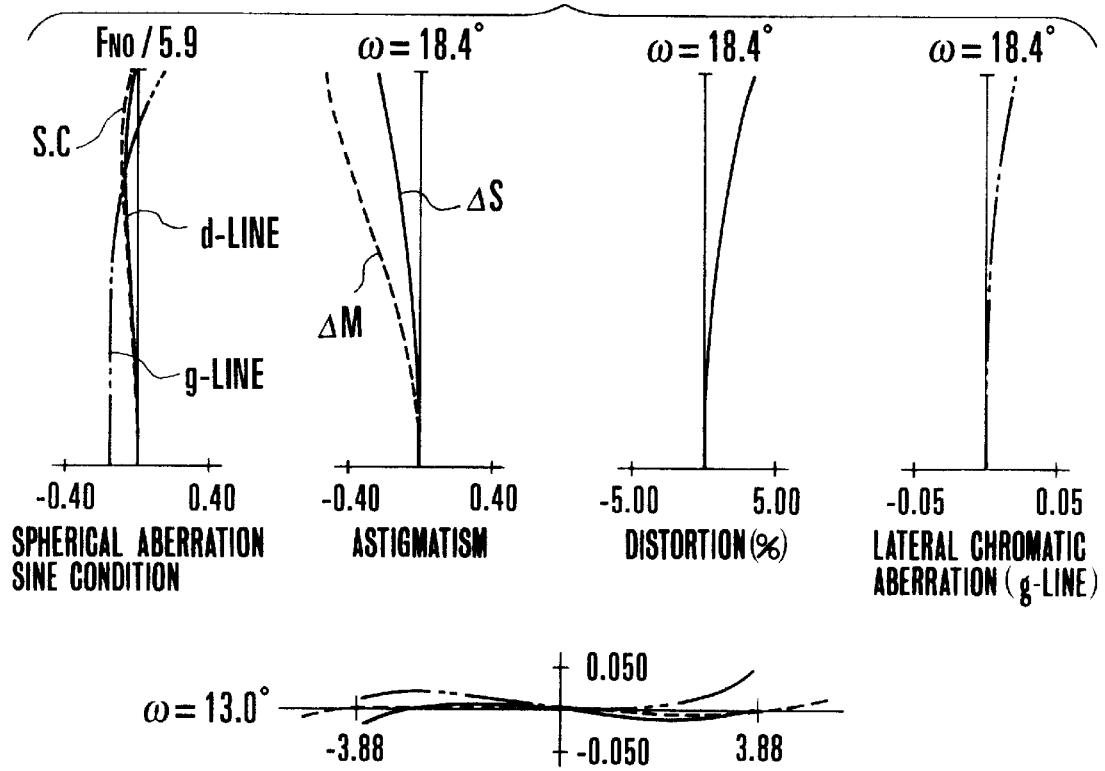
Figure 18C:
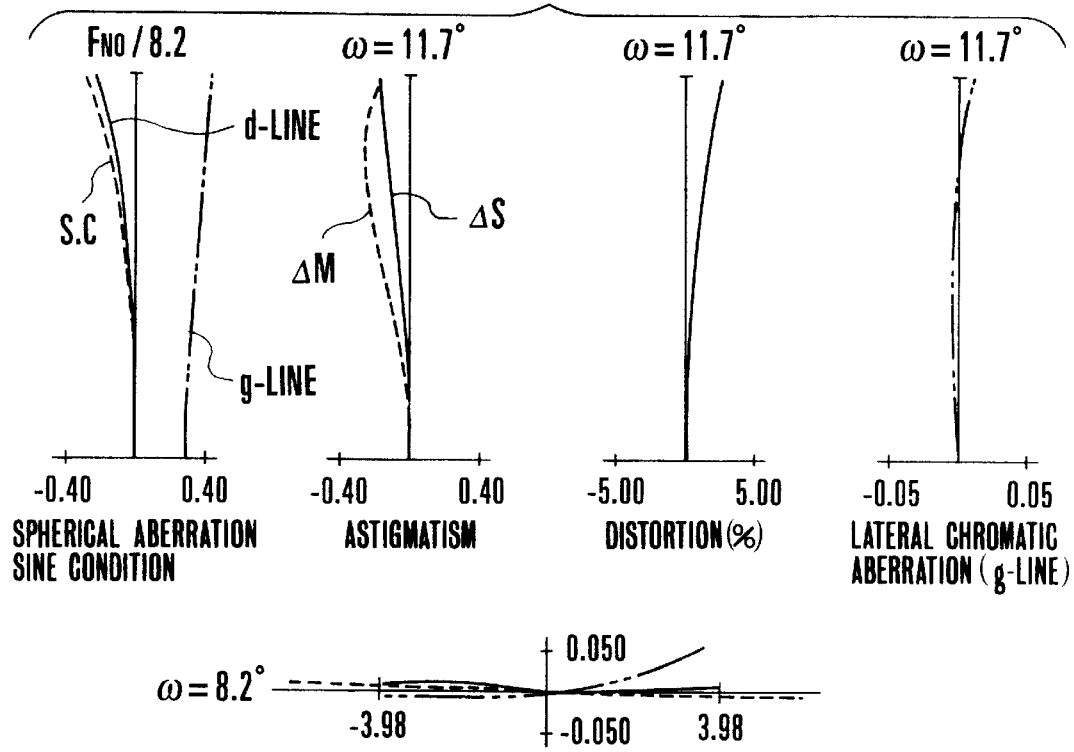
Figure 19A:
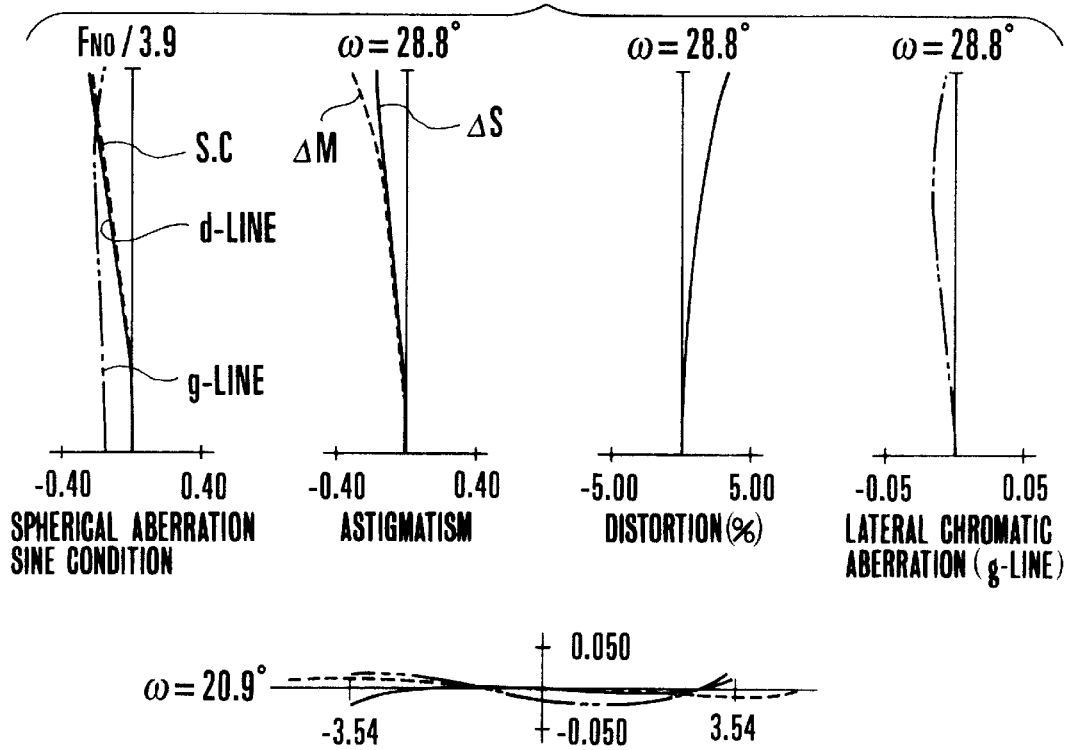
FIGS. 19(A), 19(B) and 19(C) are graphic representations of the aberrations of the numerical example 8 of the invention.
Figure 19B:
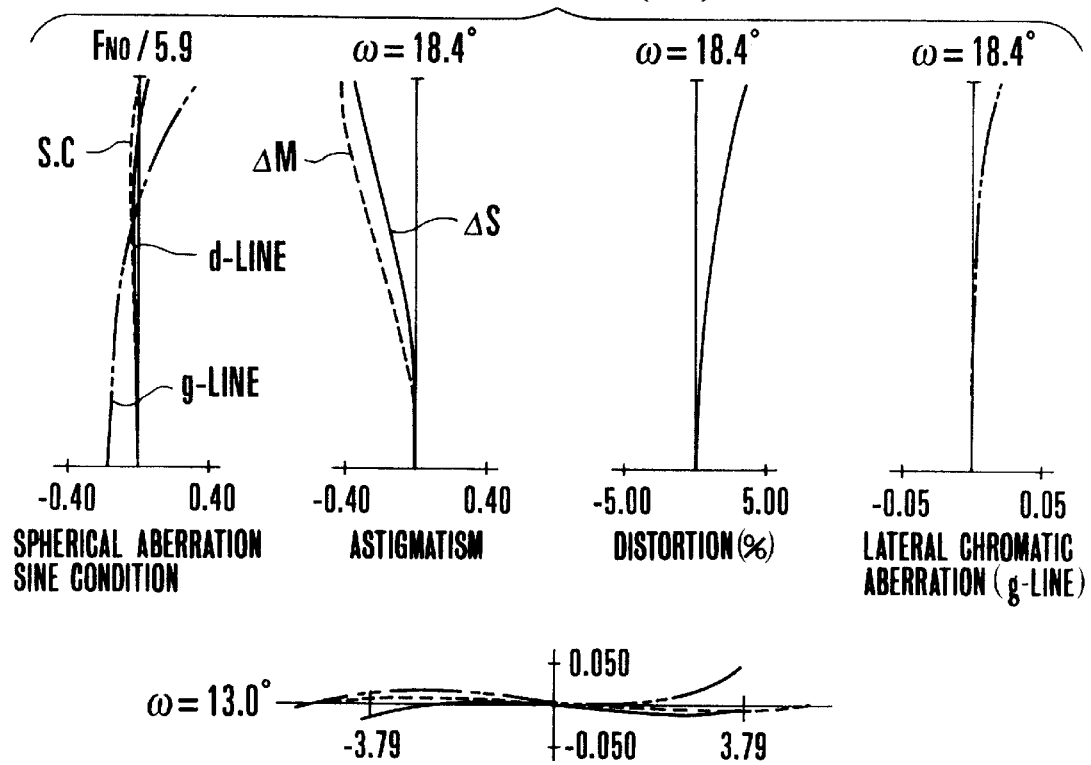
Figure 19C:
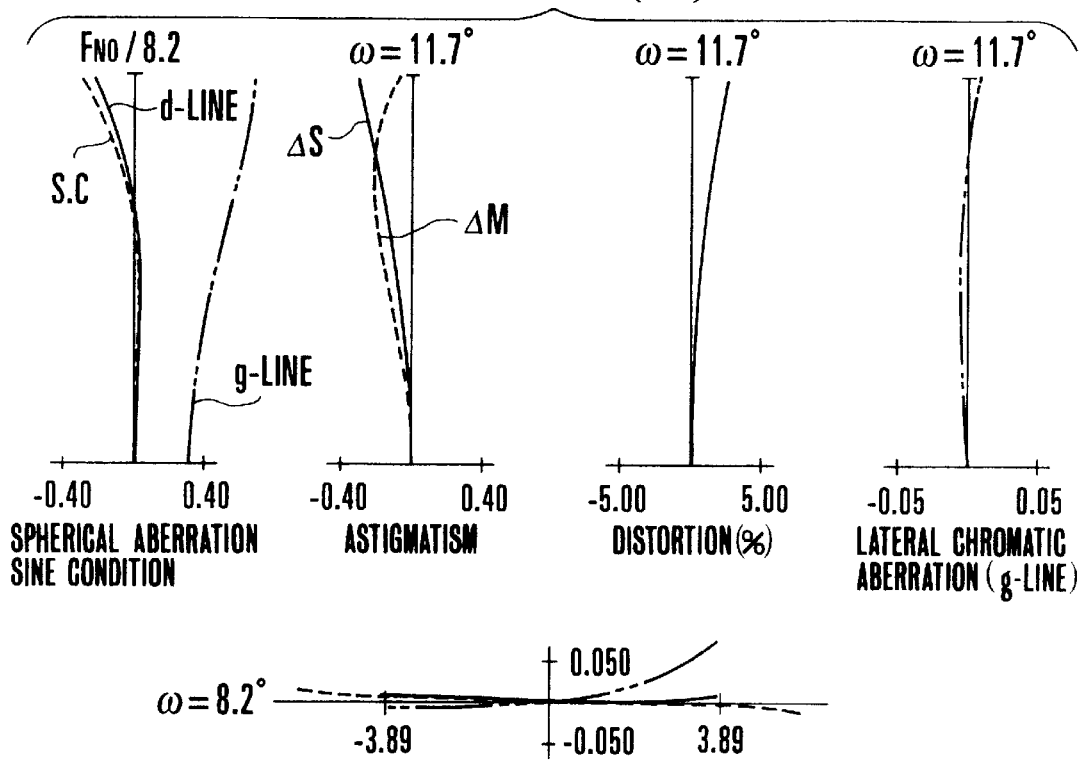
Figure 20:
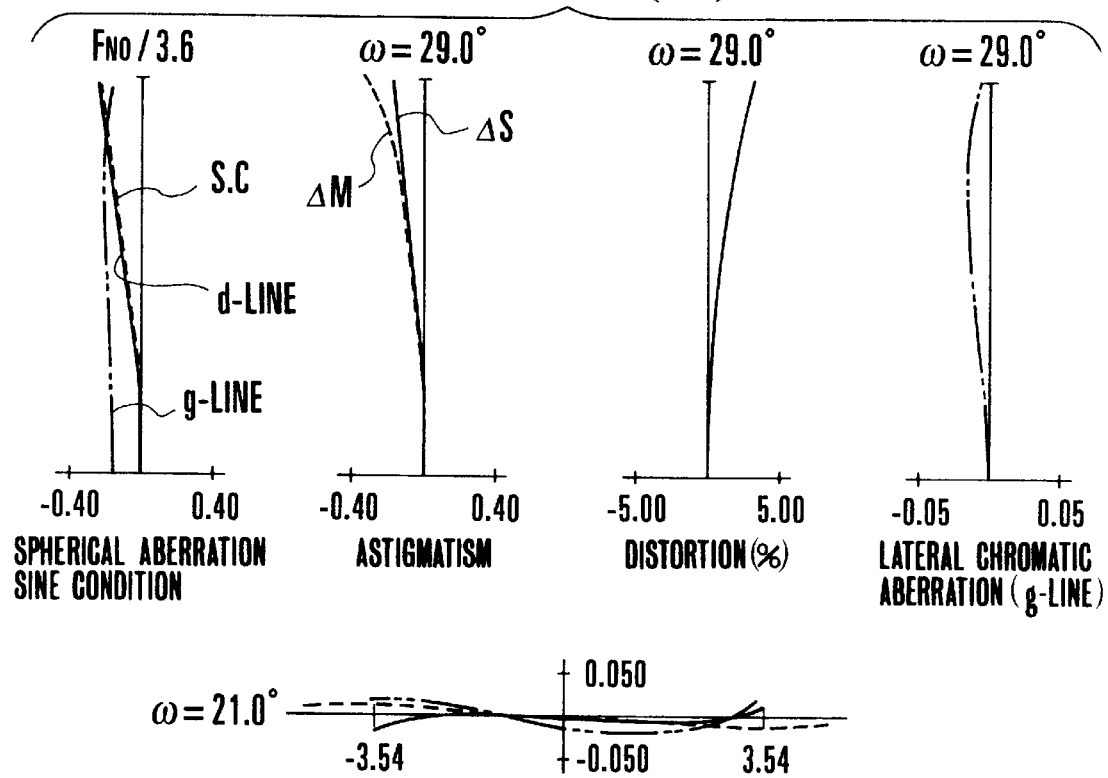
FIGS. 20(A), 20(B) and 20(C) are graphic representations of the aberrations of the numerical example 9 of the invention.
Figure 20:
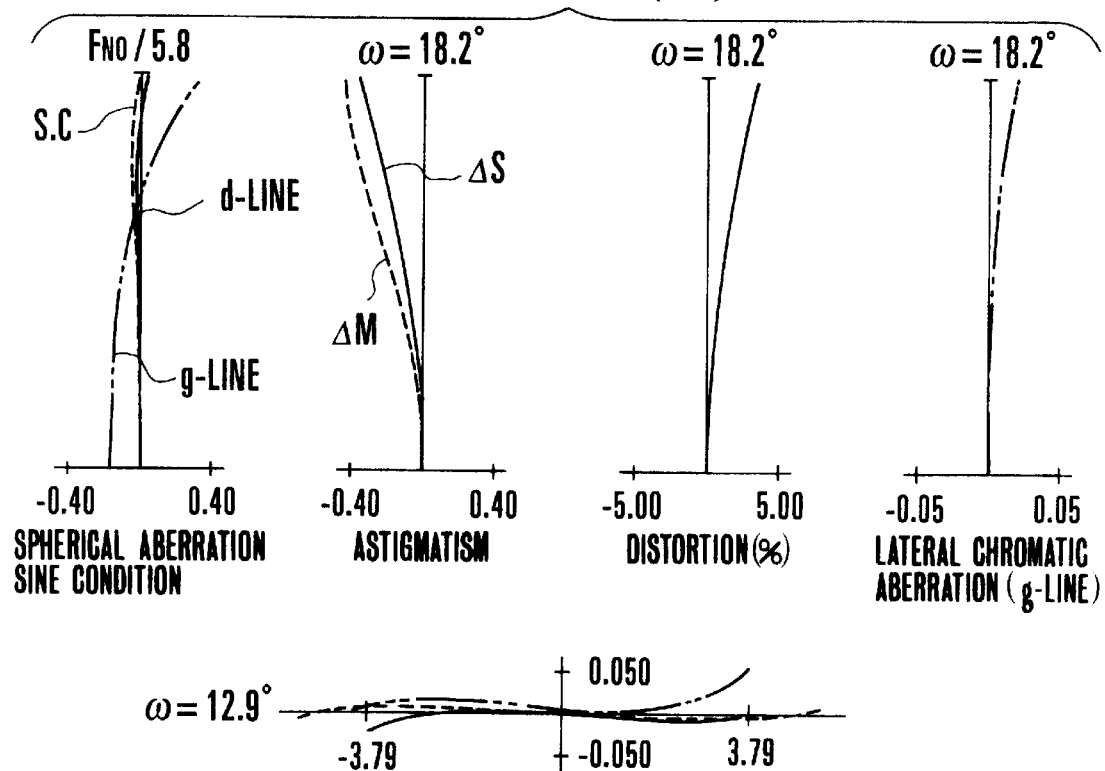
Figure 20C:
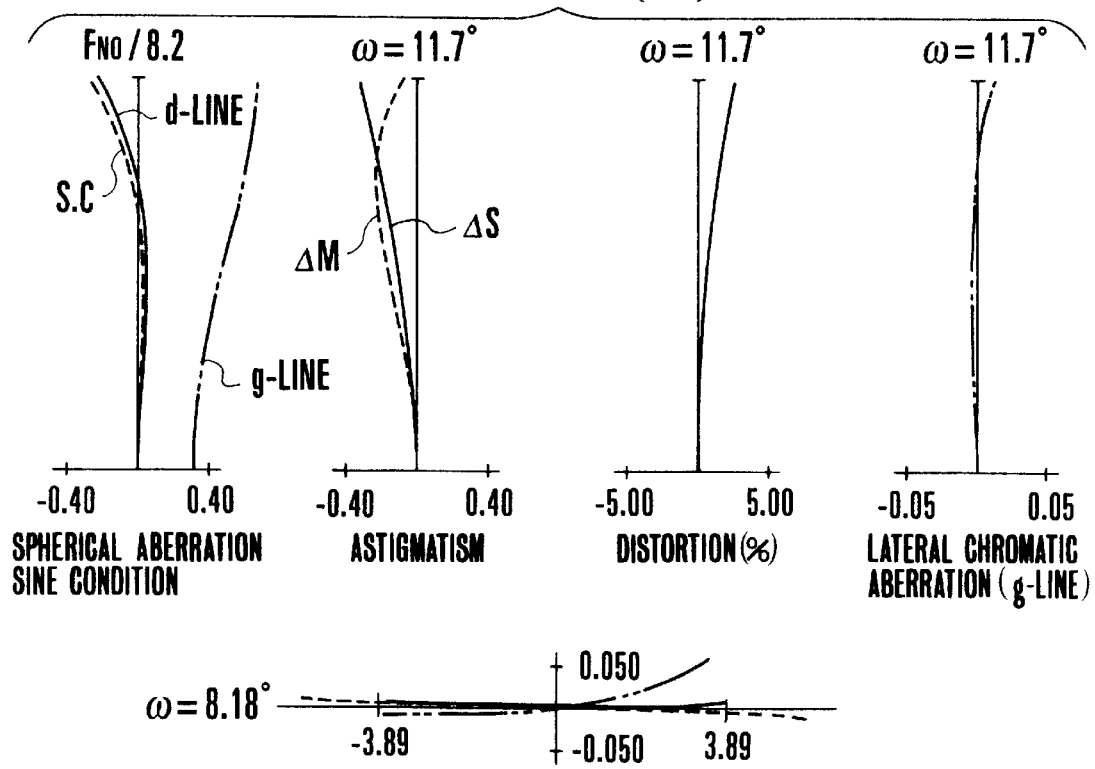
Figure 21A:
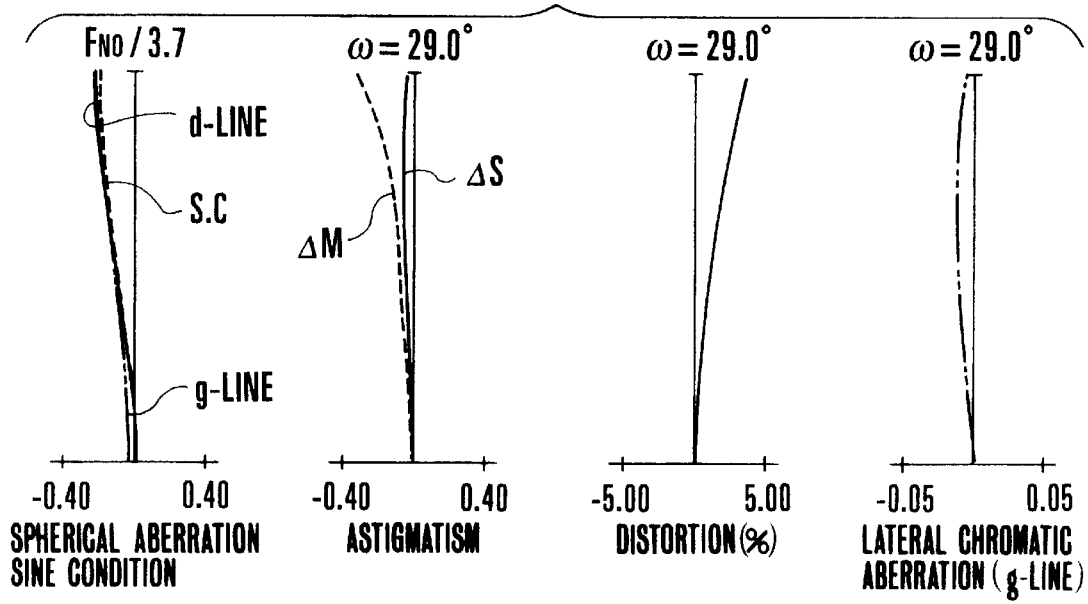
FIGS. 21(A), 21(B) and 21(C) are graphic representations of the aberrations of the numerical example 10 of the invention.
Figure 21B:
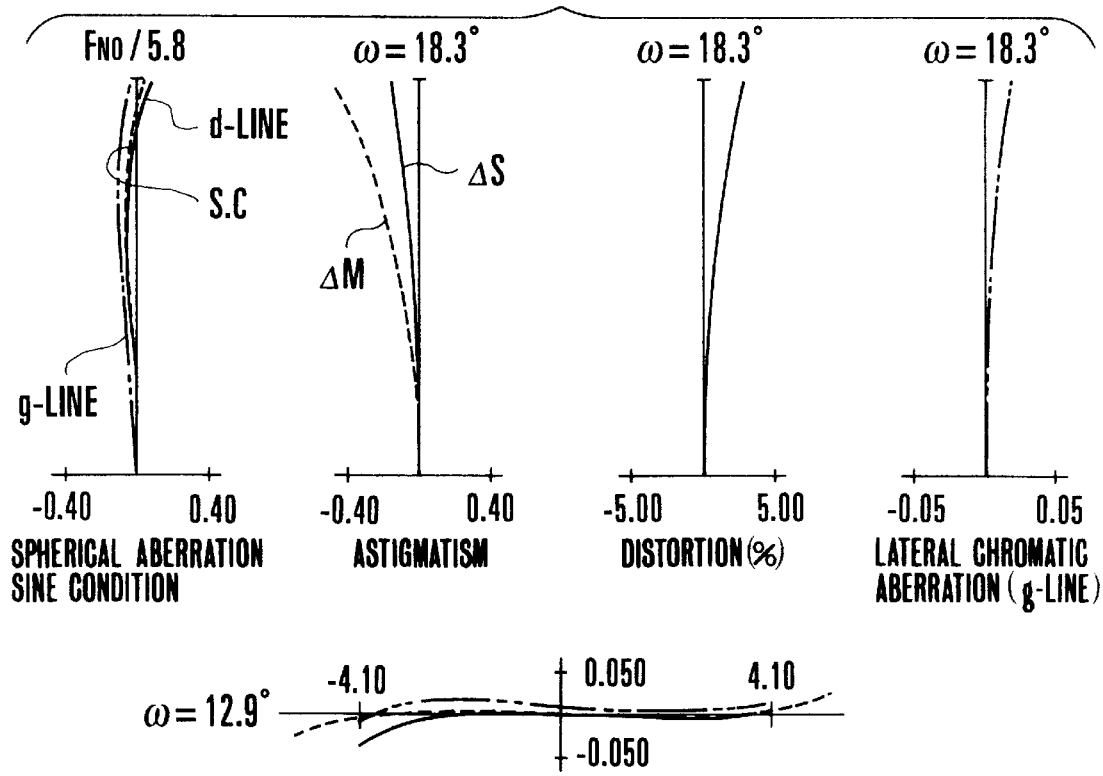
Figure 21C:
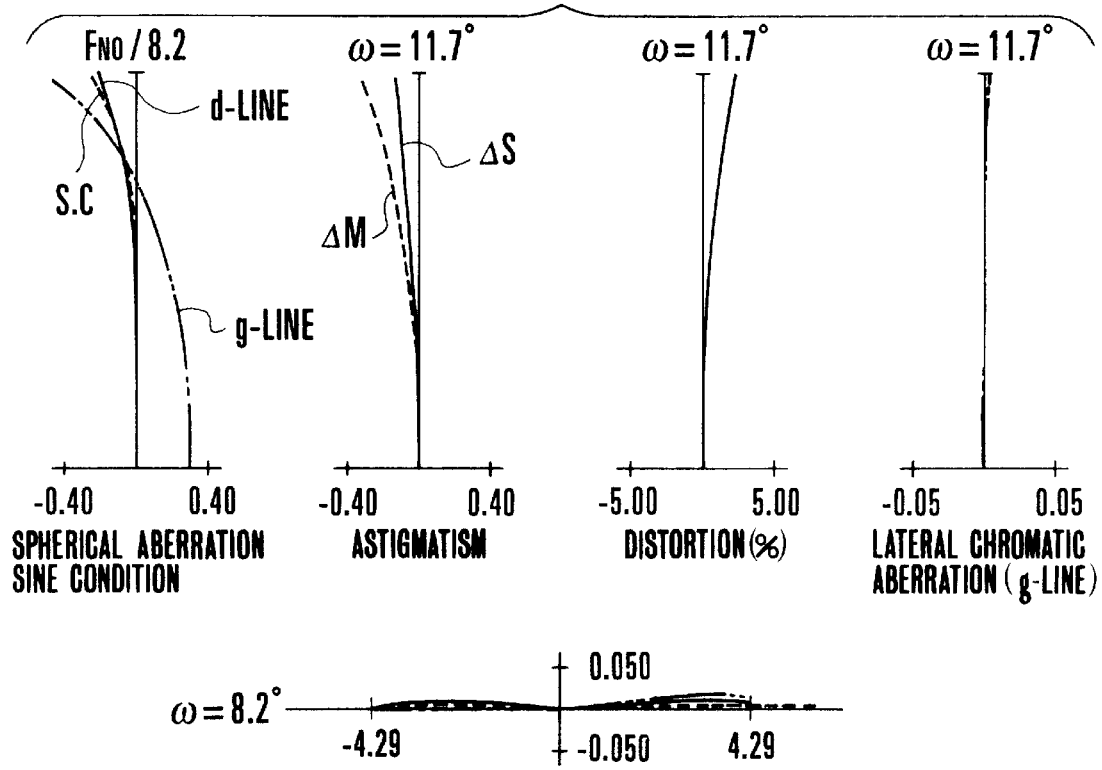

FIGS. 13(A), 13(B) and 13(C) are longitudinal section views of a numerical example 7 of a zoom lens of the invention in the wide-angle end, a middle position and the telephoto end, respectively. FIG. 14 is a diagram of geometry of an on-axial light beam LH and an off-axial light beam LG passing through the zoom lens shown in FIG. 13(A). FIGS. 15, 16 and 17 are longitudinal section views of numerical examples 8, 9 and 10 of zoom lenses of the invention in the wide-angle end.

In these figures, reference character L1 denotes a first lens unit of positive refractive power, reference character L2 denotes a second lens unit of positive refractive power, reference character denotes a third lens unit of negative refractive power, reference character SP denotes a stop, and reference character IP denotes an image plane.

In the present embodiment, zooming from the wide-angle end to the telephoto end is performed by moving the first, second and third lens units each toward the object side in such relation that the air separation between the first and second lens units increases and the air separation between the second and third lens units decreases.

The second lens unit L2 comprises a front lens subunit L2a and a rear lens subunit L2b of positive refractive power. The stop SP is positioned on the object side of the rear lens subunit L2b. The front lens subunit L2a includes a negative lens 2aN having a concave surface facing the object side, and the rear lens subunit L2b includes, at the rearmost position thereof, a negative lens 2bN of following condition:

$$\nu_{2bN} < \nu_{2aN} \qquad (7)$$

where $\nu_{2aN}$ and $\nu_{2bN}$ are the Abbe numbers of the materials of the negative lenses 2aN and 2bN, respectively.

The second lens unit L2 is made up from two parts of different optical properties on correction of aberrations, namely, the front lens subunit L2a of either positive or negative refractive power and the rear lens subunit L2b of positive refractive power.

Of these, the front lens subunit L2a is provided at the object side with the negative lens 2aN having a concave surface facing the object side. By this concave surface of the negative lens 2aN, the coma produced from the first lens unit L1 is corrected well.

The rear lens subunit L2b is provided at the rearmost position with the negative lens 2bN of meniscus form convex toward the image side. The negative lens 2bN takes its axial position where, as shown in the diagram of the optical paths of FIG. 14, the off-axial light beam passes farthest away from the optical axis (at a height of incidence $h_1$) within the second lens unit.

In the present embodiment, the Abbe number of the material of the negative lens 2bN is appropriately determined to well correct mainly lateral chromatic aberration. Further, the negative lens 2bN is in concentric relation to the stop SP. By this, the coma due to the light rays of short wavelengths such as g-line is corrected well.

Meanwhile, as shown in FIG. 14, for the axial light beam LH passing through the negative lens 2bN of the rear lens subunit L2b, the rays that define the F-number ($F_{NO}$ rays) are relatively high (at a height of incidence $h_2$). Because of this, the longitudinal chromatic aberration tends to be overcorrected.

So, in the invention, the negative lenses 2aN and 2bN are made from the materials having such Abbe numbers as to satisfy the condition (7), thereby correcting the lateral and longitudinal chromatic aberrations in good balance.

The zoom lens according to the invention is achieved by satisfying the features or conditions described above. To obtain even higher optical performance throughout the entire zooming range, it is preferable to satisfy at least one of the following features:

(i) The front lens subunit L2a is provided with a positive lens 2ap on the image side of the negative lens 2aN, satisfying the following condition:

$$\nu_{2ap} < \nu_{2aN} \qquad (8)$$

where $\nu_{2ap}$ is the Abbe number of the material of the positive lens 2ap.

(ii) The stop SP is arranged on the object side of the second lens unit and is made to move either in unison with the second lens unit, or independently, during zooming. According to this, the diameter of the front lens members can be effectively reduced.

(iii) On the object side of the negative lens 2bN of the rear lens subunit L2b, there is arranged a positive aspherical lens whose positive refractive power gets progressively weaker as away from the optical axis. According to this, the coma can be well corrected over the entire area of the image frame.

(iv) The rear lens subunit L2b has at least two positive lenses. According to this, the positive refractive power of the rear lens subunit L2b can be borne in proper shares on the two positive lenses. So, spherical aberration and coma can be corrected in good balance throughout the entire zooming range.

(v) The rear lens subunit L2b is constructed from a cemented lens composed of a positive lens 2bp and the negative lens 2bN of meniscus form, satisfying the following conditions:

$$36 < \nu_{2bp} - \nu_{2bN} \qquad (9)$$

$$0.23 < |R_{ap}|/fw < 0.5 \qquad (10)$$

where $\nu_{2bp}$ is the Abbe number of the material of the positive lens 2bp, $R_{ap}$ is the radius of curvature of a cemented surface of the cemented lens, and fw is the shortest focal length of the entire lens system.

By cementing the positive lens 2bp and the negative lens 2bN together, mainly the lateral chromatic aberration is corrected well.

By satisfying the condition (9), the lateral chromatic aberration is corrected well mainly in the wide-angle end.

By satisfying the condition (10), the longitudinal and lateral chromatic aberrations are corrected in good balance throughout the entire zooming range. Particularly when the upper limit of the condition (10) is exceeded, undercorrection of lateral chromatic aberration results in the wide-angle end. When the lower limit is exceeded, undercorrection of longitudinal chromatic aberration results in the telephoto end.

(vi) The stop SP is arranged on the object side of the second lens unit L2, satisfying the following condition:

$$0.4 < L_{sp}/fw < 0.6 \qquad (11)$$

where L is the distance from the stop SP to the rear lens subunit L2b. According to this, while achieving minimization of the size of the entire lens system, the variation with zooming of chromatic aberrations can be corrected well.

When the lower limit of the condition (11) is exceeded, the height of incidence of the axial light rays on the cemented surface becomes lower, making it difficult to correct lateral chromatic aberration on the wide-angle side. When the upper limit is exceeded, the diameter of the rear lens members increases, causing the size of the entire lens system to increase objectionably.

(vii) The first lens unit L1 is constructed from a negative lens of meniscus form convex toward the object side and a positive lens of meniscus form convex toward the object side in this order from the object side.

(viii) The front lens subunit L2a is constructed from a negative lens 2aN having a concave surface facing the object side and a positive lens having a convex surface facing the image side. (ix) The rear lens subunit L2b is constructed either as comprising, in the order from the image side, a negative lens 2bN of meniscus form convex toward the image side and a positive lens, totaling two lenses, or as comprising a negative lens 2bN of meniscus form convex toward the image side, a positive lens and another positive lens, totaling three lenses.

(x) The third lens unit L3 is constructed from a positive lens of meniscus form convex toward the image side, a negative lens and another negative lens of meniscus form convex toward the image side in this order from the object side.

If these items (vii), (viii), (ix) and (x) are satisfied, it is easy to obtain high optical performance throughout the entire zooming range and over the entire area of the image frame.

Next, numerical examples 7 to 10 of the invention are shown. In the numerical data for the examples 7 to 10, Ri is the radius of curvature of the ith lens surface, when counted from the object side, Di is the i-th axial lens thickness or air separation, when counted from the object side, and Ni and vi are respectively the refractive index and Abbe number of the material of the i-th lens element, when counted from the object side.

Also, the relationship of the above-described conditions (7) to (11) with the numerical values in the numerical examples 7 to 10 is shown in Table-2.

The shape of an aspheric surface is expressed in the coordinates with an X axis in the axial direction and an H axis in the direction perpendicular to the optical axis, the direction in which light advances being taken as positive, by the following equation:

$$X = (1/R)H^2/(1 + \sqrt{1 - (H/R)^2}) + AH^2 + BH^4 + CH^6 + DH^8 + EH^{10}$$

where R is the radius of the osculating sphere, and A, B, C, D and E are the aspheric coefficients.

Numerical Example 7:

f = 39.22–104.48  Fno = 1:3.8–8.2  2ω = 57.8°–23.4°

| | | | |
|---|---|---|---|
| R 1 = 35.91 | D 1 = 1.50 | N 1 = 1.84666 | ν 1 = 23.9 |
| R 2 = 25.67 | D 2 = 0.50 | | |
| R 3 = 21.51 | D 3 = 2.50 | N 2 = 1.48749 | ν 2 = 70.2 |
| R 4 = 385.50 | D 4 = Variable | | |
| R 5 = (Stop) | D 5 = 2.00 | | |
| R 6 = −15.09 | D 6 = 1.20 | N 3 = 1.51633 | ν 3 = 64.2 |
| R 7 = 262.70 | D 7 = 6.40 | N 4 = 1.63980 | ν 4 = 34.5 |
| R 8 = −21.33 | D 8 = 5.00 | | |
| R 9 = 73.52 | D 9 = 5.10 | N 5 = 1.58313 | ν 5 = 59.4 |
| R10 = −11.56 | D10 = 1.10 | N 6 = 1.84666 | ν 6 = 23.9 |
| R11 = −19.76 | D11 = Variable | | |
| R12 = −33.37 | D12 = 2.30 | N 7 = 1.84666 | ν 7 = 23.8 |
| R13 = −20.92 | D13 = 0.12 | | |
| R14 = −37.64 | D14 = 1.40 | N 8 = 1.71300 | ν 8 = 53.8 |
| R15 = 283.02 | D15 = 5.00 | | |
| R16 = −16.74 | D16 = 1.70 | N 9 = 1.71300 | ν 9 = 53.8 |
| R17 = −112.18 | | | |

R9: Aspheric Surface:
B=−7.724x10$^{-6}$ C=1.957x10$^{-8}$

| Variable | Focal Length | | |
|---|---|---|---|
| Separation | 39.22 | 65.20 | 104.48 |
| D 4 | 3.00 | 8.07 | 16.62 |
| D11 | 11.92 | 5.49 | 1.14 |

Numerical Example 8:

f = 39.30–104.29  Fno = 1:3.9–8.2  2ω = 57.6°–23.4°

| | | | |
|---|---|---|---|
| R 1 = 32.55 | D 1 = 1.50 | N 1 = 1.84666 | ν 1 = 23.9 |
| R 2 = 23.75 | D 2 = 0.50 | | |
| R 3 = 20.34 | D 3 = 2.50 | N 2 = 1.48749 | ν 2 = 70.2 |
| R 4 = 201.60 | D 4 = Variable | | |
| R 5 = (Stop) | D 5 = 2.00 | | |
| R 6 = −16.41 | D 6 = 1.20 | N 3 = 1.51633 | ν 3 = 64.2 |
| R 7 = 62.12 | D 7 = 6.40 | N 4 = 1.63980 | ν 4 = 34.5 |
| R 8 = −25.54 | D 8 = 4.00 | | |
| R 9 = 90.74 | D 9 = 6.00 | N 5 = 1.58313 | ν 5 = 59.4 |
| R10 = −10.70 | D10 = 1.10 | N 6 = 1.84666 | ν 6 = 23.9 |
| R11 = −17.62 | D11 = Variable | | |
| R12 = −34.36 | D12 = 2.30 | N 7 = 1.84666 | ν 7 = 23.8 |
| R13 = −21.02 | D13 = 0.12 | | |
| R14 = −34.80 | D14 = 1.40 | N 8 = 1.71300 | ν 8 = 53.8 |
| R15 = 217.69 | D15 = 5.00 | | |
| R16 = −17.02 | D16 = 1.70 | N 9 = 1.71300 | ν 9 = 53.8 |
| R17 = −90.19 | | | |

R9: Aspheric Surface:
B=−1.364x10$^{5}$ C=4.224x10$^{-8}$

| Variable | Focal Length | | |
|---|---|---|---|
| Separation | 39.30 | 65.06 | 104.29 |
| D 4 | 3.00 | 8.21 | 16.90 |
| D11 | 11.92 | 5.53 | 1.14 |

Numerical Example 9:

f = 39.0–104.28  Fno = 1:3.6–8.2  2ω = 58°–23.4°

| | | | |
|---|---|---|---|
| R 1 = 66.17 | D 1 = 1.50 | N 1 = 1.84666 | ν 1 = 23.9 |
| R 2 = 39.50 | D 2 = 0.50 | | |
| R 3 = 25.68 | D 3 = 2.50 | N 2 = 1.48749 | ν 2 = 70.2 |
| R 4 = −541.10 | D 4 = Variable | | |
| R 5 = (Stop) | D 5 = 2.00 | | |
| R 6 = −15.25 | D 6 = 1.00 | N 3 = 1.48749 | ν 3 = 70.2 |
| R 7 = 16.84 | D 7 = 7.30 | N 4 = 1.56138 | ν 4 = 45.2 |
| R 8 = −27.57 | D 8 = 3.90 | | |
| R 9 = −103.35 | D 9 = 1.80 | N 5 = 1.48749 | ν 5 = 70.2 |
| R10 = −24.73 | D10 = 0.12 | | |
| R11 = 42.11 | D11 = 4.90 | N 6 = 1.48749 | ν 6 = 70.2 |
| R12 = −14.02 | D12 = 1.10 | N 7 = 1.84666 | ν 7 = 23.9 |
| R13 = −26.27 | D13 = Variable | | |
| R14 = −40.85 | D14 = 2.90 | N 8 = 1.84666 | ν 8 = 23.8 |
| R15 = −19.98 | D15 = 0.12 | | |
| R16 = −28.65 | D16 = 1.30 | N 9 = 1.69680 | ν 9 = 55.5 |
| R17 = 134.83 | D17 = 5.50 | | |
| R18 = −14.91 | D18 = 1.50 | N10 = 1.71300 | ν10 = 53.8 |
| R19 = −77.88 | | | |

| Variable | Focal Length | | |
|---|---|---|---|
| Separation | 39.00 | 65.49 | 104.28 |
| D 4 | 3.00 | 7.39 | 14.94 |
| D13 | 10.43 | 4.70 | 1.09 |

Numerical Example 10:

| f = 39.0–104.46 | Fno = 1:3.7–8.2 | 2ω = 58°–23.4° | |
|---|---|---|---|
| R 1 = 66.15 | D 1 = 1.50 | N 1 = 1.84666 | ν 1 = 23.9 |
| R 2 = 38.83 | D 2 = 0.50 | | |
| R 3 = 25.03 | D 3 = 2.50 | N 2 = 1.48749 | ν 2 = 70.2 |
| R 4 = −284.26 | D 4 = Variable | | |
| R 5 = (Stop) | D 5 = 2.00 | | |
| R 6 = −13.76 | D 6 = 1.00 | N 3 = 1.48749 | ν 3 = 70.2 |
| R 7 = 15.81 | D 7 = 8.23 | N 4 = 1.56138 | ν 4 = 45.2 |
| R 8 = −20.42 | D 8 = 2.18 | | |
| R 9 = −121.57 | D 9 = 1.80 | N 5 = 1.48749 | ν 5 = 70.2 |
| R10 = −29.42 | D10 = 0.12 | | |
| R11 = 52.63 | D11 = 4.00 | N 6 = 1.48749 | ν 6 = 70.2 |
| R12 = −14.07 | D12 = 1.10 | N 7 = 1.84666 | ν 7 = 23.9 |
| R13 = −28.00 | D13 = Variable | | |
| R14 = −41.63 | D14 = 2.60 | N 8 = 1.84666 | ν 8 = 23.8 |
| R15 = −20.73 | D15 = 0.12 | | |
| R16 = −30.78 | D16 = 1.30 | N 9 = 1.69680 | ν 9 = 55.5 |
| R17 = 104.08 | D17 = 5.50 | | |
| R18 = −15.07 | D18 = 1.50 | N10 = 1.71300 | ν10 = 53. 8 |
| R19 = −58.23 | | | |

| Variable | Focal Length | | |
|---|---|---|---|
| Separation | 39.00 | 65.28 | 104.46 |
| D 4 | 3.00 | 6.75 | 14.30 |
| D13 | 11.28 | 5.13 | 1.16 |

TABLE 2

| | Numerical Example | | | |
|---|---|---|---|---|
| Condition | 7 | 8 | 9 | 10 |
| $\nu_{2aN}$ | 64.2 | 64.2 | 70.2 | 70.2 |
| $\nu_{2bN}$ | 23.9 | 23.9 | 23.9 | 23.9 |
| $\nu_{2ap}$ | 34.5 | 34.5 | 45.2 | 45.2 |
| $|R_{ap}|/fw$ | 0.29 | 0.27 | 0.36 | 0.36 |
| $L_{sp}/fw$ | 0.530 | 0.527 | 0.567 | 0.524 |

According to the above-described embodiment of the invention, as applied to the zoom lens which performs zooming by moving three lens units of certain refractive powers, rules of design for the construction and arrangement of the constituent elements of each lens unit are set forth as described before. Hence, it becomes possible to achieve a zoom lens of shortened total length, while still permitting high optical performance to be maintained throughout the entire zooming range of 2.7 or thereabout.

What is claimed is:

1. A zoom lens comprising, in order from an object side to an image side, a first lens unit of positive refractive power, a second lens unit of positive refractive power and a third lens unit of negative refractive power, wherein zooming from a wide-angle end to a telephoto end is performed by moving said first, second and third lens units toward the object side in such relation that an air separation between said first and second lens units increases and an air separation between said second and third lens units decreases, said first lens unit including at least one negative lens and at least one positive lens, said second lens unit including a negative first lens having a concave surface facing the object side, a positive second lens, wherein said negative first lens and said positive second lens are not cemented, and a cemented lens composed of a negative third lens having a concave surface facing the image side and a positive fourth lens having both surfaces convex, said zoom lens satisfying the following condition:

$$0.19 < \beta_{2W}/\beta_{3W} < [0.05]0.5 \text{ (where } \beta_{2W} > 0, \beta_{3W} > 0)$$

where $\beta_{2W}$ and $\beta_{3W}$ are lateral magnifications in the wide-angle end of said second and third lens units, respectively.

2. A zoom lens according to claim 1, satisfying the following conditions:

$$0.75 < f2/f_W [<1.25]$$

$$0.6 < |1/\varnothing_{2-1} \cdot f_2)|$$

where $f_2$ is the focal length of said second lens unit, $f_W$ is the shortest focal length of the entire lens system, and $\varnothing_{2-1}$ is the refracting power of a frontmost lens surface in said second lens unit.

3. A zoom lens according to claim 1, further comprising a stop located in between a front lens surface of said first lens unit and a rear lens surface of said second lens unit.

4. A zoom lens comprising, in order from an object side to an image side, a first lens unit of positive refractive power, a stop, a second lens unit of positive refractive power and a third lens unit of negative refractive power, wherein zooming from a wide-angle end to a telephoto end is performed by moving said first, second and third lens units toward the object side in such relation that an air separation between said first and second lens units increases and an air separation between said second and third lens units decreases, said first lens unit including at least one negative lens and at least one positive lens, said second lens unit including (a) a first cemented lens composed, in order from an object side to an image side, of a negative first lens having a concave surface facing the object side and a positive second lens and (b) a second cemented lens composed of a negative third lens having a concave surface facing the image side and a positive fourth lens having both surfaces convex, wherein no lens exists between said first and second cemented lenses.

5. A zoom lens according to claim 4, satisfying the following conditions:

$$f_2/f_W < 1.25$$

$$0.6 < |1/(\varnothing_{2-1} \cdot f_2)|[<1 \cdot 15]$$

where $f_2$ is the focal length of said second lens unit, $f_W$ is the shortest focal length of the entire lens system, and $\varnothing_{2-1}$ is the refracting power of a frontmost lens surface in said second lens unit.

6. A zoom lens comprising, in order from an object side to an image side, a first lens unit of positive refractive power, a second lens unit of positive refractive power and a third lens unit of negative refractive power, wherein zooming from a wide-angle end to a telephoto end is performed by moving said first, second and third lens units toward the object side in such relation that an air separation between said first and second lens units increases and an air separation between said second and third lens units decreases, and wherein said second lens unit comprises a front lens subunit and a rear lens subunit of positive refractive power and a stop is located on the object side of said rear lens subunit, said front lens subunit including a negative lens having a concave surface facing the object side, and said rear lens subunit including, as the last lens at the rearmost side thereof, a negative lens of meniscus form convex toward the image side, said zoom lens satisfying the following condition:

$$\nu_{2bN} < \nu 2aN$$

where $v_{2aN}$ and $v_{2bN}$ are Abbe numbers of the materials of said negative lens in said front lens subunit and said negative lens in said rear lens subunit, respectively.

7. A zoom lens according to claim 6, wherein said rear lens subunit further includes, on the object side of said negative lens in said rear lens subunit, a positive lens having an aspheric surface whose positive refractive power gets progressively weaker as going away from an optical axis.

8. A zoom lens according to claim 6, wherein said rear lens subunit includes at least two positive lenses.

9. A zoom lens comprising, in order from an object side to an image side, a first lens unit of positive refractive power, a second lens unit of positive refractive power and a third lens unit of negative refractive power, wherein zooming from a wide-angle end to a telephoto end is performed by moving said first, second and third lens units toward the object side in such relation that an air separation between said first and second lens units increases and an air separation between said second and third lens units decreases, said first lens unit including at least one negative lens and at least one positive lens, said second lens unit including (a) a first cemented lens composed, in order from an object side to an image side, of a negative first lens having a concave surface facing the object side and a positive second lens and (b) a second cemented lens composed of a negative third lens having a concave surface facing the image side and a positive fourth lens having both surfaces convex, said third lens unit including a positive lens and a plurality of negative lenses, wherein no lens exists between said first and second cemented lenses.

10. A zoom lens according to claim 9, wherein said positive lens of said third lens unit is a positive meniscus lens having a convex surface facing the image side and said plurality of lenses of said third lens unit are a negative lens having a concave surface facing the object side and a negative lens having a concave surface facing the object side.

11. A zoom lens comprising, in order from an object side to an image side, a first lens unit of positive refractive power, a second lens unit of positive refractive power and a third lens unit of negative refractive power, wherein zooming from a wide-angle end to a telephoto end is performed by moving said first, second and third lens units toward the object side in such relation that an air separation between said first and second lens units increases and an air separation between said second and third lens units decreases, said first lens unit including at least one negative lens and at least one positive lens, and said second lens unit including a cemented lens composed of a negative meniscus first lens having a concave surface facing the object side and a positive second lens.

12. A zoom lens comprising, in order from an object side to an image side, a first lens unit of positive refractive power, a second lens unit of positive refractive power and a third lens unit of negative refractive power, wherein zooming from a wide-angle end to a telephoto end is performed by moving said first, second and third lens units toward the object side in such relation that an air separation between said first and second lens units increases and an air separation between said second and third lens units decreases, said first lens unit including a negative meniscus lens having a convex surface facing the image side and at least one positive lens, and said second lens unit including (a) a first cemented lens composed, in order from an object side to an image side, of a negative first lens having a concave surface facing the object side and a positive second lens and (b) a second cemented lens composed of a negative third lens having a concave surface facing the image side and a positive fourth lens having both surfaces convex, wherein no lens exists between said first and second cemented lenses.

13. A zoom lens according to claim 1, further comprising a diaphragm located between said first lens unit and said second lens unit.

14. A zoom lens comprising, in order from an object side to an image side, a first lens unit of positive refractive power, a stop, a second lens unit of positive refractive power and a third lens unit of negative refractive power, wherein zooming from a wide-angle end to a telephoto end is performed by moving said first, second and third lens units toward the object side in such relation that an air separation between said first and second lens units increases and an air separation between said second and third lens units decreases, said first lens unit including at least one negative lens and at least one positive lens, said second lens unit including (a) a first cemented lens composed, in order from an object side to an image side, of a negative lens having a concave surface facing the object side and a positive lens and (b) a second cemented lens consisting of a negative lens and a positive lens, wherein no lens exists between said first and second cemented lenses, and wherein said negative lens of said first lens unit has a concave surface facing the object side.

15. A zoom lens comprising, in order from an object side to an image side, a first lens unit of positive refractive power, a second lens unit of positive refractive power and a third lens unit of negative refractive power, wherein zooming from a wide-angle end to a telephoto end is performed by moving said first, second and third lens units toward the object side in such relation that an air separation between said first and second lens units increases and an air separation between said second and third lens units decreases, said first lens unit including at least one negative lens and at least one positive lens, said second lens unit including (a) a first cemented lens composed, in order from an object side to an image side, of a negative lens having a concave surface facing the object side and a positive lens and (b) a second cemented lens consisting of a negative lens and a positive lens, wherein no lens exists between said first and second cemented lenses, and wherein said negative lens of said first lens unit has a concave surface facing the object side.

16. A zoom lens according to claim 15, said zoom lens satisfying the following condition:

$$0.19 < \beta_{2W}/\beta_{3W} < 0.5 \text{ (where } \beta_{2W} > 0, \beta_{3W} > 0)$$

where $\beta_{2W}$ and $\beta_{3W}$ are lateral magnifications in the wide-angle end of said second and third lens units, respectively.

* * * * *

UNITED STATES PATENT AND TRADEMARK OFFICE
CERTIFICATE OF CORRECTION

PATENT NO.   :   5,831,772

DATED        :   November 3, 1998

INVENTOR(S)  :   Akihiro NISHIO, et al.

It is certified that error appears in the above-identified patent and that said Letters Patent is hereby corrected as shown below:

ON THE COVER PAGE:

At [57] Abstract:

Line 1, "a" should be deleted.
      Line 6, "lenses" should read --lens--.

COLUMN 1:

Line 34, "largely." should read --greatly.--.

COLUMN 4:

Line 43, "first one" should read --first lens--.
   Line 44, "one." should read --lens.--.

COLUMN 5:

Line 10, "largely." should read --greatly.--
   Line 67, "well correct" should read --correct well--.

UNITED STATES PATENT AND TRADEMARK OFFICE
CERTIFICATE OF CORRECTION

PATENT NO. : 5,831,772

DATED : November 3, 1998

INVENTOR(S) : Akihiro NISHIO, et al.

It is certified that error appears in the above-identified patent and that said Letters Patent is hereby corrected as shown below:

COLUMN 6:

Line 63, "well correct" should read --correct well--.

COLUMN 10:

Line 45, "$\beta_{B3W}$" should read --$\beta_{3W}$--.

COLUMN 11:

Line 9, "character" should read --character L3--.
   Line 49, "well correct" should read --correct well--.

COLUMN 12:

Line 5, "$\nu_{2ap<\nu 2aN}$" should read --$\nu_{2ap} < \nu_{2aN}$--.
   Line 55, "L" should read --$L_{sp}$--.

COLUMN 13:

Line 6, "(ix)" should begin a new paragraph.
   Line 24, "ith" should read --i-th--.

UNITED STATES PATENT AND TRADEMARK OFFICE
CERTIFICATE OF CORRECTION

PATENT NO.    : 5,831,772

DATED         : November 3, 1998

INVENTOR(S)   : Akihiro NISHIO, et al.

It is certified that error appears in the above-identified patent and that said Letters Patent is hereby corrected as shown below:

<u>COLUMN 16</u>:

Line 67, "$\nu_{2bN} < \nu 2aN$" should read --$\nu_{2bN} < \nu_{2aN}$--.

Signed and Sealed this

Twenty-fourth Day of August, 1999

*Attest:*

Q. TODD DICKINSON

*Attesting Officer*    *Acting Commissioner of Patents and Trademarks*